(12) United States Patent
Lee et al.

(10) Patent No.: US 10,700,530 B2
(45) Date of Patent: Jun. 30, 2020

(54) METHOD FOR AVOIDING SIGNAL COLLISION IN WIRELESS POWER TRANSFER

(71) Applicant: LG ELECTRONICS INC., Seoul (KR)

(72) Inventors: Jaesung Lee, Suwon-Si (KR); Yongcheol Park, Gwacheon-Si (KR); Jun Lee, Seongnam-Si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/167,094

(22) Filed: Oct. 22, 2018

(65) Prior Publication Data

US 2019/0058332 A1 Feb. 21, 2019

Related U.S. Application Data

(63) Continuation of application No. 15/047,441, filed on Feb. 18, 2016, now Pat. No. 10,135,260, which is a (Continued)

(30) Foreign Application Priority Data

Jun. 29, 2011 (KR) .................. PCT/KR2011/004743

(51) Int. Cl.
*G01S 1/00* (2006.01)
*G08B 1/08* (2006.01)
(Continued)

(52) U.S. Cl.
CPC .............. *H02J 5/005* (2013.01); *H02J 7/00* (2013.01); *H02J 7/0013* (2013.01); *H02J 50/12* (2016.02);
(Continued)

(58) Field of Classification Search
CPC .... H02J 2007/0096; H02J 7/00; H02J 7/0013; H02J 7/025; H02J 50/90; H02J 50/12; H02J 5/005; H02J 50/80
See application file for complete search history.

(56) References Cited

U.S. PATENT DOCUMENTS 5,657,326 A 8/1997 Burns et al.
6,346,047 B1 2/2002 Sobota et al.
(Continued)

FOREIGN PATENT DOCUMENTS

EP 2034615 A2 8/2010
WO WO 2010/087496 A1 8/2010

*Primary Examiner* — Alfonso Perez Borroto
*Assistant Examiner* — Esayas G Yeshaw
(74) *Attorney, Agent, or Firm* — Birch, Stewart, Kolasch & Birch, LLP

(57) ABSTRACT

A wireless power transmitter, includes a power conversion unit configured to form a wireless power for power transmission; and a power transmission control unit configured to control the power conversion unit to detect a collision between a first packet generated by a first wireless power receiver and a second packet generated by a second wireless power receiver in a same time slot, and control the power conversion unit to transmit information indicating the collision to the first wireless power receiver and the second wireless power receiver.

13 Claims, 27 Drawing Sheets

Related U.S. Application Data continuation of application No. 13/538,486, filed on Jun. 29, 2012, now Pat. No. 9,300,147.

(60) Provisional application No. 61/502,714, filed on Jun. 29, 2011.

(51) Int. Cl.
  *H04B 7/185* (2006.01)
  *H02J 5/00* (2016.01)
  *H02J 50/80* (2016.01)
  *H02J 50/90* (2016.01)
  *H02J 7/00* (2006.01)
  *H02J 50/12* (2016.01)

(52) U.S. Cl.
  CPC ............. *H02J 50/80* (2016.02); *H02J 50/90* (2016.02); *H02J 7/00034* (2020.01)

(56) References Cited

U.S. PATENT DOCUMENTS

| | | | |
|---|---|---|---|
| 6,721,546 B1 | 4/2004 | Compton | |
| 7,002,947 B1 | 2/2006 | McFarland et al. | |
| 7,595,619 B2 | 9/2009 | Vieira Formenti | |
| 7,916,677 B2 | 3/2011 | Hall | |
| 8,054,776 B2 | 11/2011 | Molisch et al. | |
| 8,410,637 B2 | 4/2013 | Karaoguz et al. | |
| 8,521,847 B2 | 8/2013 | Shinomiya | |
| 8,766,487 B2 | 7/2014 | Dibben et al. | |
| 9,300,147 B2 | 3/2016 | Lee et al. | |
| 9,805,862 B2 | 10/2017 | Kozakai | |
| 2002/0015382 A1 | 2/2002 | Fukuda | |
| 2006/0256822 A1* | 11/2006 | Kwong | H04L 29/06027 370/503 |
| 2007/0008108 A1* | 1/2007 | Schurig | G01S 5/0215 340/539.11 |
| 2007/0066314 A1* | 3/2007 | Sherman | H04W 88/06 455/445 |
| 2007/0274272 A1* | 11/2007 | Joshi | H04L 1/0001 370/338 |
| 2009/0322158 A1 | 12/2009 | Stevens et al. | |
| 2010/0007307 A1 | 1/2010 | Baarman et al. | |
| 2010/0036773 A1 | 2/2010 | Bennett | |
| 2011/0019618 A1 | 1/2011 | Joo | |
| 2011/0127953 A1 | 6/2011 | Walley et al. | |
| 2011/0148215 A1 | 6/2011 | Marzetta et al. | |
| 2011/0291488 A1 | 12/2011 | Paik et al. | |
| 2012/0200169 A1* | 8/2012 | Urano | H02J 5/005 307/104 |
| 2013/0049471 A1 | 2/2013 | Oleynik et al. | |
| 2013/0131876 A1 | 5/2013 | Lee et al. | |
| 2014/0035379 A1* | 2/2014 | Stevens | H02J 7/0013 307/104 |
| 2015/0318710 A1* | 11/2015 | Lee | H02J 5/005 307/104 |
| 2015/0326028 A1* | 11/2015 | Suzuki | H02J 7/025 307/104 |
| 2016/0118836 A1* | 4/2016 | Waldschmidt | H02J 7/025 320/108 |
| 2016/0149442 A1 | 5/2016 | Asanuma et al. | |
| 2017/0133880 A1* | 5/2017 | Wakisaka | H02J 50/80 |
| 2017/0163090 A1 | 6/2017 | Takikawa et al. | |

\* cited by examiner

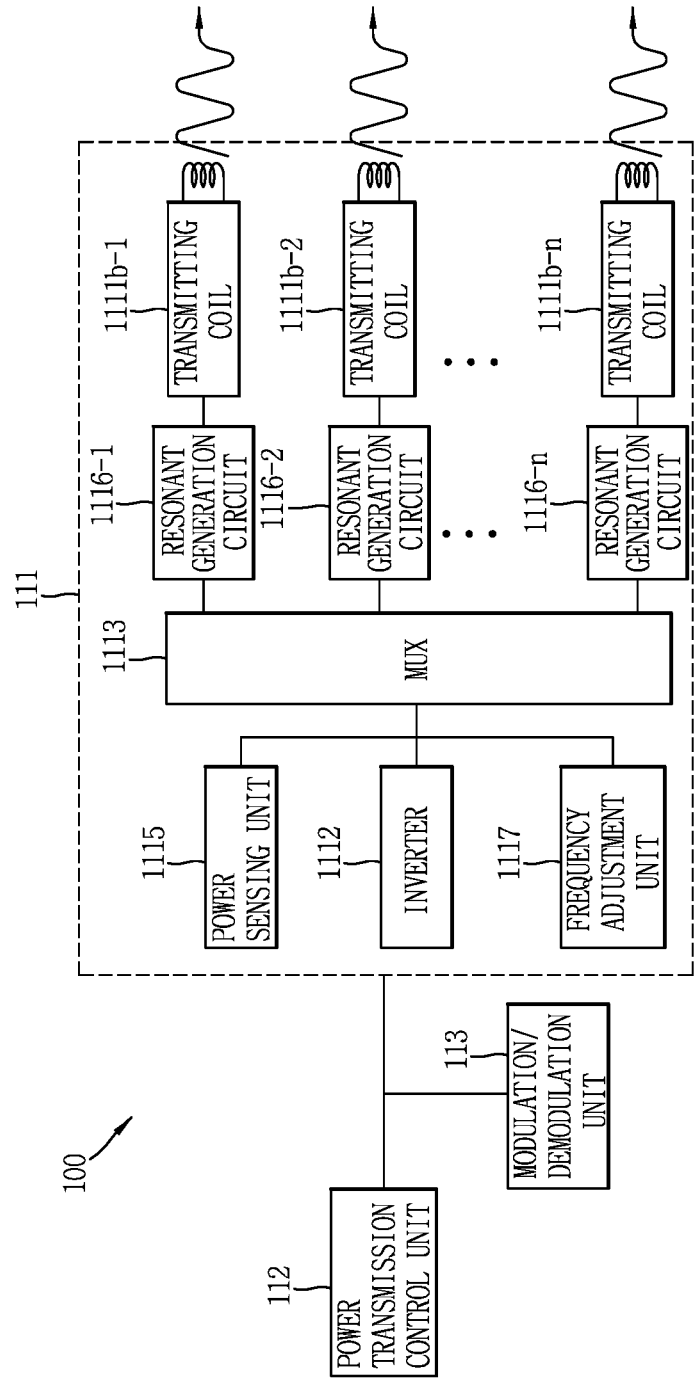

METHOD FOR AVOIDING SIGNAL COLLISION IN WIRELESS POWER TRANSFER

CROSS-REFERENCE TO RELATED APPLICATIONS

This Application is a Continuation of U.S. patent application Ser. No. 15/047,441 filed on Feb. 18, 2016, which is a Continuation of U.S. patent application Ser. No. 13/538,486 filed on Jun. 29, 2012 (now U.S. Pat. No. 9,300,147 issued on Mar. 29, 2016), which claims the benefit under 35 U.S.C. § 119(e) to U.S. Provisional Application No. 61/502,714 filed on Jun. 29, 2011, and under 35 U.S.C. § 119(a) to PCT Application No. PCT/KR2011/004743 filed on Jun. 29, 2011, all of which are hereby expressly incorporated by reference into the present application.

BACKGROUND OF THE INVENTION

The present disclosure relates to wireless power transfer (contactless power transfer), and more particularly, wireless power transfer according to a charge characteristic.

In recent years, the method of contactlessly supplying electrical energy to electronic devices in a wireless manner has been used instead of the traditional method of supplying electrical energy in a wired manner. The electronic device receiving energy in a wireless manner may be directly driven by the received wireless power, or a battery may be charged by using the received wireless power, then allowing the electronic device to be driven by the charged power.

SUMMARY OF THE INVENTION

In accordance with the embodiments disclosed herein, there is provided a wireless power transmitter, a wireless power receiver and a method for avoiding signal collision thereof, capable of stably and efficiently performing data communication, by allowing a new wireless power receiver in a listening mode to analyze a response signal formed by a specific wireless power receiver and transmit its response signal at a collision-avoided time point when the new wireless power receiver is placed in a specific area while a wireless power transmitter performs communication with the specific wireless power receiver.

In an embodiment, there is disclosed a wireless power transmitter including a power conversion unit configured to form a wireless power signal for power transmission, and a power transmission control unit configured to control the power conversion unit to receive a first response signal corresponding to the wireless power signal from a first wireless power receiver, and to receive a second response signal avoiding collision with the first response signal from a second wireless power receiver, wherein the second wireless power receiver may receive the first response signal, detect a time point when the second response signal avoids collision with the first response signal, and generate the second response signal at the collision-avoided time point.

In one aspect of the present disclosure, the first response signal and the second response signal may be generated by modulating the wireless power signal.

In one aspect of the present disclosure, when the second wireless power receiver is placed in a specific area, the second wireless power receiver may operate in a listening mode. Here, when the second wireless power receiver operates in the listening mode, the second wireless power receiver may receive the first response signal, detect a time point when the second response signal avoids collision with the first response signal, and generate the second response signal at the collision-avoided time point.

In one aspect of the present disclosure, the specific area may indicate an area through which the wireless power signal passes or an area in which the second wireless power receiver is detected.

In accordance with one exemplary embodiment of the present disclosure, there is provided a wireless power receiver including a power receiving unit configured to receive a wireless power signal from a wireless power transmitter, a modulation/demodulation unit configured to generate a third response signal by modulating the wireless power signal, and a power reception control unit configured to control the power receiving unit to receive a fourth response signal generated by another wireless power receiver receiving the wireless power signal, to detect a time point when the third response signal avoids collision with the fourth response signal, and to control the modulation/demodulation unit to generate the fourth response signal at the collision-avoided time point.

In accordance with one exemplary embodiment of the present disclosure, there is provided a signal collision avoiding method in a wireless power transfer, the method including forming a wireless power signal for power transmission, periodically receiving a first response signal from the first wireless power receiver, the first response signal corresponding to the wireless power signal, and receiving a second response signal avoiding collision with the first response signal from a second wireless power receiver when the second wireless power receiver is placed in a specific area, wherein the second wireless power receiver may receive the first response signal, detect a time point when the second response signal avoids collision with the first response signal, and generate the second response signal at the collision-avoided time point.

In a wireless power transmitter, a wireless power receiver and a wireless power transfer method in accordance with exemplary embodiments, when a plurality of electronic devices are placed in or enter an active area or detection area of the wireless power transmitter for receiving power in a wireless manner, a newly placed electronic device may be allowed to analyze a response signal of a previously placed electronic device(s) (or wireless power receiver(s)) and generate its own response signal at a collision-avoided time point, thereby avoiding collision with response signals of the other electronic device(s).

Especially, according to the wireless power transmitter, the wireless power receiver (or electronic device) and the wireless power transfer method disclosed herein, the probability of collision between the response signals can be reduced, which may result in an efficient and stable wireless power transmission from the wireless power transmitter to the plurality of electronic devices in a simultaneous manner.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a block diagram illustrating a wireless power transmitter configured to have one or more transmitting coils receiving power according to a resonance coupling method that can be employed in the embodiments disclosed herein;

DETAILED DESCRIPTION OF THE INVENTION

Figure 1:
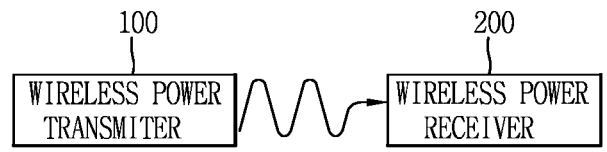
FIG. 1 is an exemplary view conceptually illustrating a wireless power transmitter and an electronic device according to the embodiments of the present invention.

The technologies disclosed herein may be applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms.

The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

FIG. 1—Conceptual View of Wireless Power Transmitter and Electronic Device

FIG. 1 is an exemplary view conceptually illustrating a wireless power transmitter and an electronic device according to the embodiments of the present invention.

Referring to FIG. 1, the wireless power transmitter 100 may be a power transfer apparatus configured to transfer power required for the electronic device 200 in a wireless manner.

Furthermore, the wireless power transmitter 100 may be a wireless charging apparatus configured to charge a battery of the electronic device 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the electronic device 200 requiring power in a contactless state.

The electronic device 200 is a device that is operable by receiving power from the wireless power transmitter 100 in a wireless manner. Furthermore, the electronic device 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The electronic device 200, as described later, may be a mobile communication terminal, (for example, a portable phone, a cellular phone, and a tablet or multimedia device). In case where the electronic device is a mobile terminal, it will be described later with reference to FIG. 10.

On the other hand, the wireless power transmitter 100 may transfer power in a wireless manner without mutual contact to the electronic device 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the electronic device 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and electronic device 200 according to the embodiments disclosed herein will be described in detail. In assigning reference numerals to the constituent elements in each of the following drawings, the same reference numerals will be used for the same constituent elements even though they are shown in a different drawing.

FIG. 2 is an exemplary block diagrams illustrating the configuration of a wireless power transmitter 100 and an electronic device 200 that can be employed in the embodiments disclosed herein.

Figure 2A:
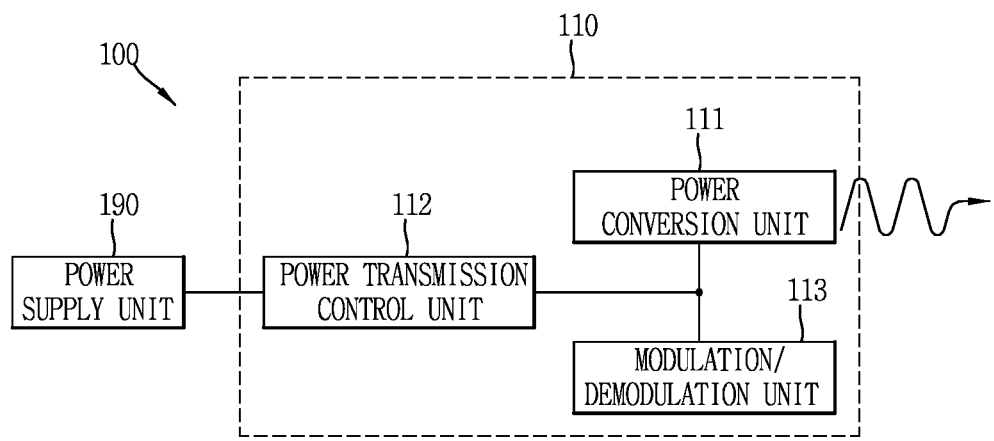
FIGS. 2A and 2B are exemplary block diagrams illustrating the configuration of a wireless power transmitter 100 and an electronic device 200 that can be employed in the embodiments disclosed herein, respectively.

FIG. 2A—Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the electronic device 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method.

In accordance with exemplary embodiments, the power conversion unit 111 may include a primary coil for forming a changing magnetic field to induce a current to a secondary coil of the electronic device 200. Furthermore, the power conversion unit 111 may include a coil (or antenna) for forming a magnetic field having a specific resonant frequency to generate a resonant frequency in the electronic device 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110 The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the electronic device 200 is passed. Next, a semi-active area denotes an interest region in which the wireless power transmitter 100 can detect the existence of the electronic device 200. Here, the power transmission control unit 112 may detect whether the electronic device 200 is placed in the active area or detection area or removed from the area. Specifically, the power transmission control unit 112 may detect whether or not the electronic device 200 is placed in the active area or detection area using a wireless power signal formed from the power conversion unit 111 or a sensor separately provided therein. For instance, the power transmission control unit 112 may detect the presence of the electronic device 200 by monitoring whether or not the characteristic of power for forming the wireless power signal is changed by the wireless power signal, which is affected by the electronic device 200 existing in the detection area. However, the active area and detection area may vary according to the wireless power transfer method such as an inductive coupling method, a resonance coupling method, and the like.

The power transmission control unit 112 may perform the process of identifying the electronic device 200 or determine whether to start wireless power transfer according to a result of detecting the existence of the electronic device 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the electronic device 200. In exemplary embodiments, the power transmission control unit 112 may decide the characteristic based on device identification information. In another exemplary embodiment, the power transmission control unit 112 may decide the characteristic based on required power information of the electronic device 200 or profile information related to the required power. The power transmission control unit 112 may receive a power control message from the electronic device 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the electronic device 200.

Furthermore, as another control operation using the power control message, the wireless power transmitter 100 may perform a typical control operation associated with wireless power transfer based on the power control message. For example, the wireless power transmitter 100 may receive information associated with the electronic device 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the electronic device 200 and use it to receive the power control message. The method for allowing the power conversion unit 111 to receive a power control message using a wireless power signal will be described later with reference to FIGS. 11 through 13.

In addition, the power transmission control unit 112 may acquire a power control message by receiving user data including a power control message by a communication means (not shown) included in the wireless power transmitter 100.

In accordance with one exemplary embodiment, the wireless power transmitter 100 may supply power to a plurality of electronic devices. Here, collision may occur between wireless power signal which have been modulated by the plurality of electronic devices. Hence, the constituent elements included in the wireless power transmitter 100 may perform various operations to avoid such collision between the modulated wireless power signal.

In one exemplary embodiment, the power conversion unit 111 may convert power supplied from the transmission side power supply unit 190 into a wireless power signal and transfer it to the plurality of electronic devices. For example, the plurality of electronic devices may be two electronic devices, namely, a first electronic device and a second electronic device.

The power conversion unit 111 may generate a wireless power signal for power transmission, and receive a first response signal and a second response signal corresponding to the wireless power signal.

The power transmission control unit 112 may determine whether or not the first and second response signals collide with each other. When the first and second response signals collide with each other according to the determination result, the power transmission control unit 112 may reset the power transmission.

The first and second response signals may be generated by modulating the wireless power signal through the first and second electronic devices.

Through the resetting of the power transmission, the power transmission control unit 112 may control the power conversion unit 111 to sequentially receive the first and second response signals, which are generated to avoid collision with each other.

The sequential reception indicates that the first response signal is received after a first time interval and the second response signal is received after a second time interval within a predetermined response period. The first and second time intervals may be decided based on a value obtained by generating a random number.

The predetermined response period (Tping interval) may be decided to be long enough to include both the first response signal and the second response signal. Also, it may be decided after resetting the power transmission.

In accordance with one exemplary embodiment, occurrence or non-occurrence of the collision may be determined according to whether or not the first and second response signals are decoded using a preset format. The preset format may include a preamble, a header and a message. Whether or not the first and second response signals collide with each other may be determined based on whether or not the first and second response signals are not recoverable due to an error generation in at least one of the preamble, the header and the message caused by the collision.

In accordance with one exemplary embodiment, the power conversion unit 111 may periodically receive a response signal of the first device, which does not collide with a response signal of the second device within a first response period (Tping interval_1). The power transmission control unit may decode the first response signal and the second response signal using a preset format, and determine whether or not the first and second response signals have collided with each other based on whether or not the decoding is performed. Here, the first response signal and the second response signal may be periodically received within a second response period (Tping interval_2). The second response period (Tping interval_2) may be decided long enough to include both the first and second response signals, and be decided after resetting the power transmission.

Figure 2B:
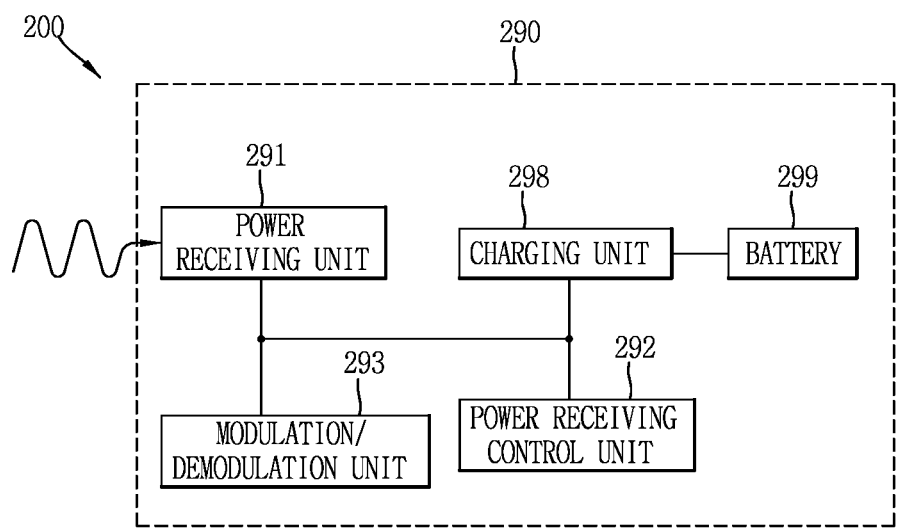

FIG. 2B—Electronic Device

Referring to FIG. 2B, the electronic device 200 may include a power supply unit 290. The power supply unit 290 supplies power required for the operation of the electronic device 200. The power supply unit 290 may include a power receiving unit 291 and a power reception control unit (or power receiving control unit) 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIGS. 4A and 4B, and those for the resonance coupling method with reference to FIGS. 7A and 7B.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit (or power receiving control unit) 292 may control each constituent element included in the power supply unit 290.

Specifically, the power reception control unit (or power receiving control unit) 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit (or power receiving control unit) 292 may transmit the power control message through the wireless power signal. In another exemplary embodiment, the power reception control unit (or power receiving control unit) 292 may transmit the power control message through a method for transmitting user data.

In order to transmit the foregoing power control message, the electronic device 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the electronic device 200, respectively, to be used to transmit and receive a power control message through a wireless power signal will be described.

A wireless power signal formed by the power conversion unit 111 is received by the power receiving unit 291. At this time, the power reception control unit (or power receiving control unit) 292 controls the power communications modulation/demodulation unit 293 at the side of the electronic device 200 to modulate the wireless power signal. For instance, the power reception control unit (or power receiving control unit) 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit (or power receiving control unit) 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet. The detailed method of allowing the wireless power transmitter 100 to acquire the power control message will be described later with reference to FIGS. 11 through 13.

In addition, the power reception control unit (or power receiving control unit) 292 may transmit a power control message to the wireless power transmitter 100 by transmitting user data including the power control message by a communication means (not shown) included in the electronic device 200.

In addition, the power supply unit 290 may further include a charger 298 and a battery 299.

The electronic device 200 receiving power for operation from the power supply unit 290 may be operated by power transferred from the wireless power transmitter 100, or operated by charging the battery 299 using the transferred power and then receiving the charged power. At this time, the power reception control unit (or power receiving control unit) 292 may control the charger 298 to perform charging using the transferred power.

In one exemplary embodiment, the plurality of electronic devices may receive power from the wireless power transmitter 100. Here, collision may occur between wireless power signal which have been modulated by the plurality of electronic devices. Hence, the constituent elements included in the wireless power transmitter 100 may perform various operations to avoid such collision between the modulated wireless power signal.

In one exemplary embodiment, the power receiving unit 291 may receive the wireless power signal for the power transmission from the wireless power transmitter.

Here, the power reception control unit (or power receiving control unit) 292 may control the power receiving unit 291 to transmit a third response signal corresponding to the wireless power signal after a time interval set to a first time within the first response period (Tping interval_1).

In one exemplary embodiment, the power reception control unit (or power receiving control unit) 292 may determine whether or not the power transmission of the wireless power transmitter 100 has been reset due to collision between the modulated wireless power signal, and set the time interval to a second time when the power transmission has been reset according to the determination result.

In one exemplary embodiment, the power reception control unit (or power receiving control unit) 292 may control the power receiving unit 291 to transmit a fourth response signal corresponding to the wireless power signal after the time interval set to the second time within the second response period (Tping interval_2). The second time may be decided by a value obtained by generating a random number. Hereinafter, a wireless power transmitter and an electronic device applicable to the embodiments disclosed herein will be described.

First, a method of allowing the wireless power transmitter to transfer power to the electronic device according to the inductive coupling method will be described with reference to FIGS. 3 through 5.

Figure 3:
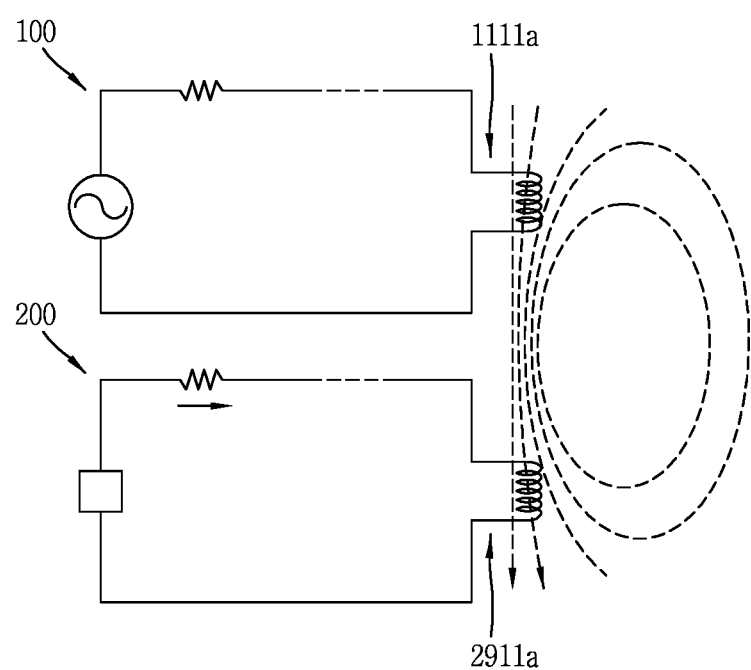
FIG. 3 is a view illustrating a concept in which power is transferred from a wireless power transmitter to an electronic device in a wireless manner according to an inductive coupling method.

FIG. 3—Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the electronic device 200.

According to the foregoing method, the power conversion unit 111 of the wireless power transmitter 100 may include a transmitting (Tx) coil 1111*a* being operated as a primary coil in magnetic induction. Furthermore, the power receiving unit 291 of the electronic device 200 may include a receiving (Rx) coil 2911*a* being operated as a secondary coil in magnetic induction.

First, the wireless power transmitter 100 and electronic device 200 are disposed in such a manner that the transmitting coil 1111*a* at the side of the wireless power transmitter 100 and the receiving coil at the side of the electronic device 200 are located adjacent to each other. Then, if the power transmission control unit 112 controls a current of the transmitting coil 1111*a* to be changed, then the power receiving unit 291 controls power to be supplied to the electronic device 200 using an electromotive force induced to the receiving coil 2911*a*.

The efficiency of wireless power transfer by the inductive coupling method may be little affected by a frequency characteristic, but affected by an alignment and distance between the wireless power transmitter 100 and the electronic device 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111*a* may be mounted at a lower portion of the interface surface. In this case, a vertical spacing is formed in a small-scale between the transmitting coil 1111*a* mounted at a lower portion of the interface surface and the receiving coil 2911*a* of the electronic device 200 placed at an upper portion of the interface surface, and thus a distance between the coils becomes sufficiently small to efficiently implement contactless power transfer by the inductive coupling method.

Furthermore, an alignment indicator (not shown) indicating a location where the electronic device 200 is to be placed at an upper portion of the interface surface. The alignment indicator indicates a location of the electronic device 200 where an alignment between the transmitting coil 1111*a* mounted at a lower portion of the interface surface and the receiving coil 2911*a* can be suitably implemented. The alignment indicator may alternatively be simple marks, or may be formed in the form of a protrusion structure for guiding the location of the electronic device 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the electronic device 200.

On the other hand, the wireless power transmitter 100 may be formed to include one or more transmitting coils. The wireless power transmitter 100 may selectively use some of coils suitably arranged with the receiving coil 2911*a* of the electronic device 200 among the one or more transmitting coils to enhance the power transmission efficiency. The wireless power transmitter 100 including the one or more transmitting coils will be described later with reference to FIG. 5.

Hereinafter, a configuration of the wireless power transmitter and electronic device using an inductive coupling method applicable to the embodiments disclosed herein will be described in detail.

Figure 4A:
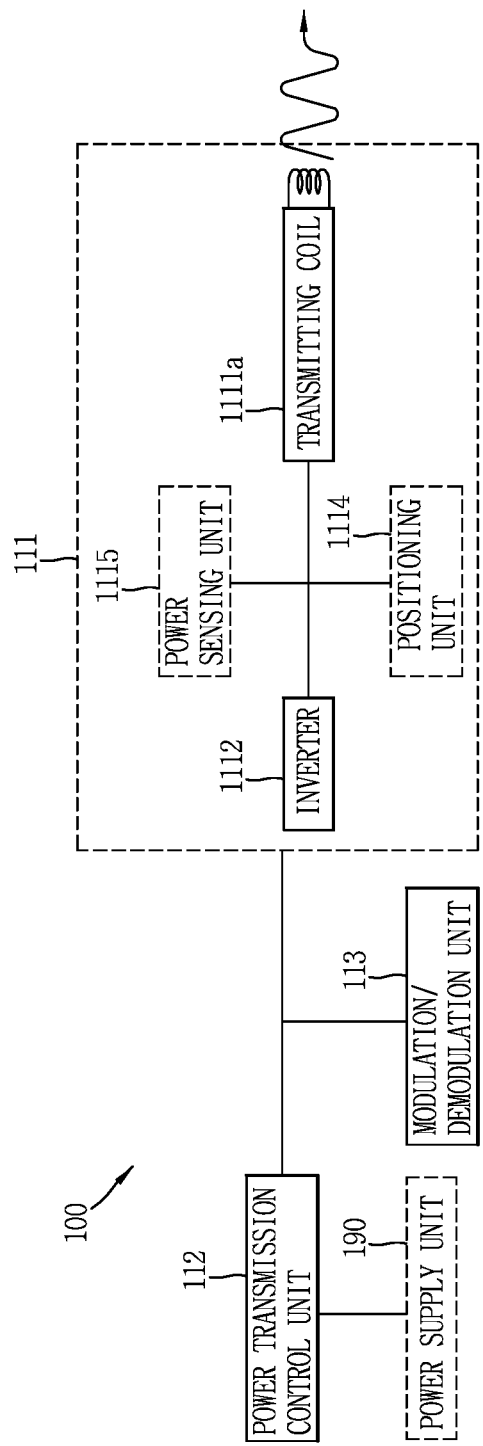
FIGS. 4A and 4B are block diagrams illustrating part of the wireless power transmitter 100 and electronic device 200 in a magnetic induction method that can be employed in the embodiments disclosed herein.
Figure 4B:
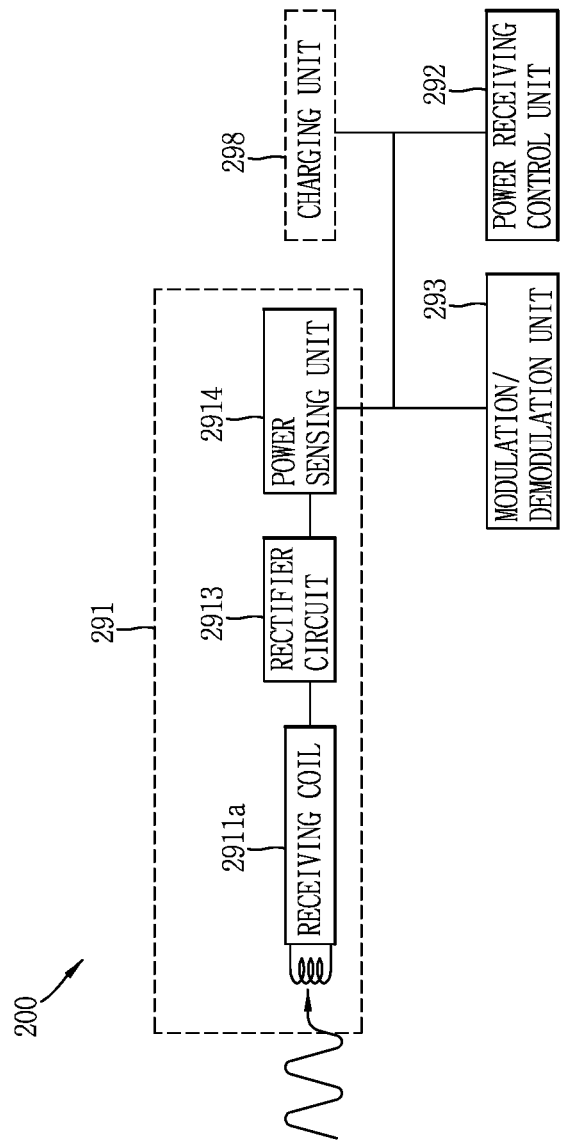

FIGS. 4A and 4B—Wireless Power Transmitter and Electronic Device in Inductive Coupling Method FIGS. 4A and 4B are block diagrams illustrating part of the wireless power transmitter 100 and electronic device 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the electronic device 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the electronic device 200 including a primary coil and a secondary coil may affect power transfer using the inductive coupling method. In particular, the positioning unit 1114 may be used when the electronic device 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the electronic device 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the electronic device 200, and the power transmission control unit 112 may control the positioning unit 1114 based on the location information of the electronic device 200 received from the location detection sensor.

Furthermore, to this end, the power transmission control unit 112 may receive control information on an alignment or distance to the electronic device 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the electronic device 200 may include a receiving (Rx) coil 2911a and a rectifier circuit 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier circuit 2913 performs a full-wave rectification to a current to convert alternating current into direct current. The rectifier circuit 2913, for instance, may be implemented with a full-bridge rectifier circuit made of four diodes or a circuit using active components.

In addition, the rectifier circuit 2913 may further include a regulator circuit for converting a rectified current into a more flat and stable direct current. Furthermore, the output power of the rectifier circuit 2913 is supplied to each constituent element of the power supply unit 290. Furthermore, the rectifier circuit 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit (or power receiving control unit IT) 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the electronic device 200 monitors a voltage and/or current of the power rectified by the rectifier circuit 2913, and if the voltage and/or current of the rectified power exceeds a threshold value as a result of monitoring, then the power reception control unit (or power receiving control unit) 292 transmits a power control message to the wireless power transmitter 100 to transfer suitable power.

Figure 5:
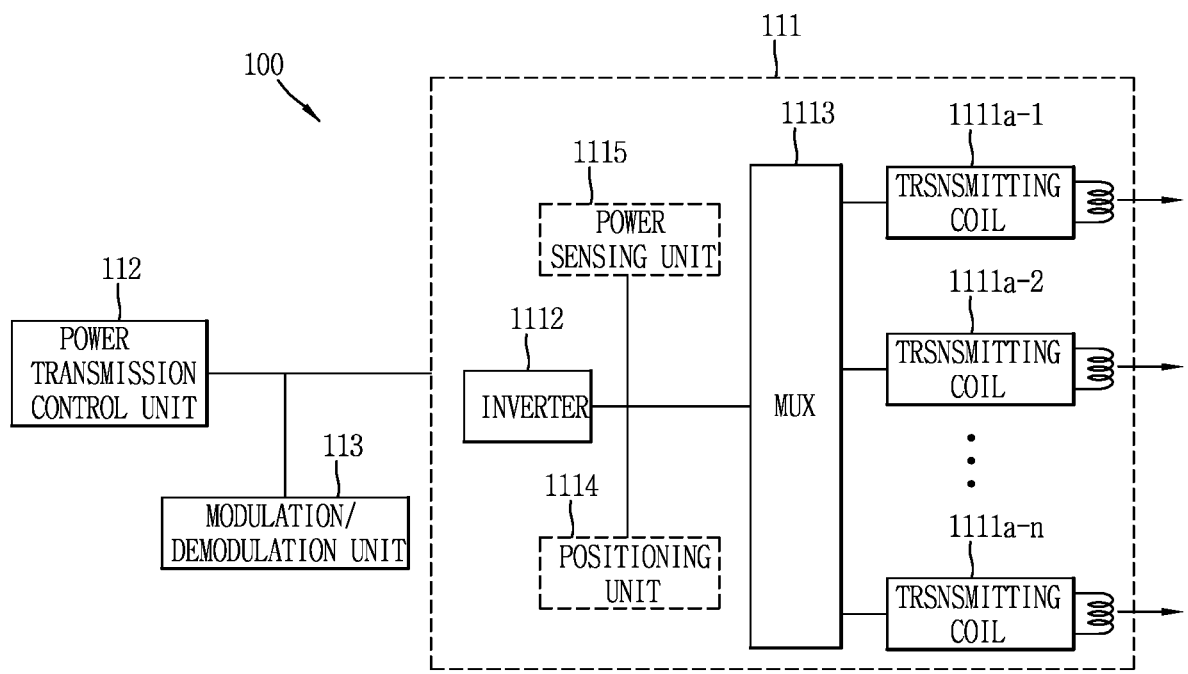
FIG. 5 is a block diagram illustrating a wireless power transmitter configured to have one or more transmitting coils receiving power according to an inductive coupling method that can be employed in the embodiments disclosed herein.

FIG. 5—Wireless Power Transmitter Configured to Include One or More Transmitting Coils FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the electronic device 200 placed at an upper portion of the interface surface, the power transmission control unit 112 may take the detected location of the electronic device 200 into consideration to control the multiplexer 1113, thereby allowing coils that can be placed in an inductive coupling relation to the receiving coil 2911a of the electronic device 200 among the one or more transmitting coils 1111a-1 to 1111a-n to be connected to one another.

For this purpose, the power transmission control unit 112 may acquire the location information of the electronic device 200. For example, the power transmission control unit 112 may acquire the location of the electronic device 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the electronic device 200.

On the other hand, the active area as part of the interface surface may denote a portion through which a magnetic field with a high efficiency can pass when the wireless power transmitter 100 transfers power to the electronic device 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the electronic device 200, and establish the connection of a primary cell corresponding to the active area to control the multiplexer 1113, thereby allowing the receiving coil 2911a of the electronic device 200 and the coils belonging to the primary cell to be placed in an inductive coupling relation.

In the meantime, upon disposing one or more electronic devices 200 on an interface surface of the wireless power transmitter 100, which includes the one or more transmitting coils 1111a-1 to 1111a-n, the power transmission control unit 112 may control the multiplexer 1113 to allow the coils belonging to the primary cell corresponding to the position of each electronic device to be placed in the inductive coupling relation. Accordingly, the wireless power transmitter 100 may generate the wireless power signal using different coils, thereby transferring it to the one or more electronic devices in a wireless manner.

Also, the power transmission control unit 112 may set power having a different characteristic to be supplied to each of the coils corresponding to the electronic devices. Here, the wireless power transmitter 100 may transfer power by differently setting a power transfer scheme, efficiency, characteristic and the like for each electronic device. The power transmission for one or more electronic devices will be described later with reference to FIG. 28.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Figure 6:
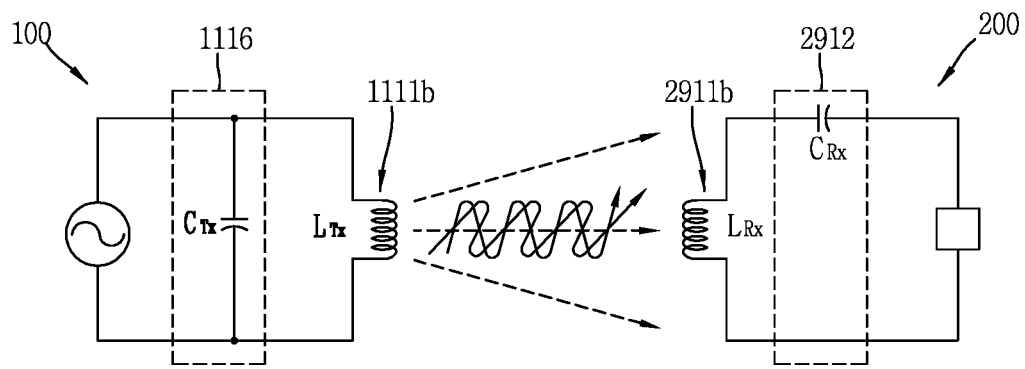
FIG. 6 is a view illustrating a concept in which power is transferred to an electronic device from a wireless power transmitter in a wireless manner according to a resonance coupling method.

FIG. 6—Resonance Coupling Method

FIG. 6 is a view illustrating a concept in which power is transferred to an electronic device from a wireless power transmitter in a wireless manner according to an resonance coupling method.

First, resonance will be described in brief as follows. Resonance refers to a phenomenon in which an amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the electronic device 200 by the formed magnetic field, then power is generated by the resonance phenomenon in the electronic device 200.

Describing a principle of the resonance coupling, in general, a method for transferring power by generating an electromagnetic wave exhibits low power transmission efficiency, and may badly affect human bodies due to radiation of the electromagnetic waves and exposure to the electromagnetic waves.

However, if the plurality of vibrating bodies resonate with each other in an electromagnetic manner as aforementioned, extremely high power transmission efficiency may be exhibited due to non affection by adjacent objects except for the vibrating bodies. An energy tunnel may be generated between the plurality of vibrating bodies which resonate with each other in the electromagnetic manner. This may be referred to as energy coupling or energy tail.

The resonance coupling disclosed herein may use an electromagnetic wave having a low frequency. When power is transferred using the electromagnetic wave having the low frequency, only a magnetic field may affect an area located within a single wavelength of the electromagnetic wave. The magnetic resonance may be generated when the wireless power transmitter 100 and the electronic device 200 are located within the single wavelength of the electromagnetic wave having the low frequency.

Here, in general, human bodies are sensitive to an electric field but tolerant to a magnetic field. Hence, when power is transferred using a magnetic resonance, the human bodies may be badly affected due to being exposed to the electromagnetic wave. Also, as the energy tail is generated in response to the resonance phenomenon, the form of power transmission may exhibit a non-radiative property. Consequently, upon transferring power using such electromagnetic wave, a radiative problem which occurs frequently may be solved.

The resonance coupling method may be a method for transferring power using the electromagnetic wave with the low frequency, as aforementioned. Thus, the transmitting coil 1111b of the wireless power transmitter 100 may form a magnetic field or electromagnetic wave for transferring power in principle. However, the resonance coupling method will be described hereinafter from the perspective of a magnetic resonance, namely, a power transmission by a magnetic field.

The resonant frequency may be determined by the following formula in Equation 1.

$$f = \frac{1}{2\pi\sqrt{LC}} \quad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit (or RESONANT GENERATION CIRCUIT) 1116 connected to the transmitting coil 1111b to determine a specific vibration frequency. The resonant circuit (or RESONANT GENERATION CIRCUIT) 1116 may be implemented by using a capacitive circuit (capacitors), and the specific vibration frequency may be determined based on an inductance of the transmitting coil 1111b and a capacitance of the resonant circuit (or RESONANT GENERATION CIRCUIT) 1116.

The configuration of a circuit element of the resonant circuit (or RESONANT GENERATION CIRCUIT) 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the electronic device 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the electronic device 200 generates resonance when a result of substituting the $L_{RX}$ and $C_{RX}$ of the electronic device 200 to the Equation 1 is same as the specific vibration frequency.

According to a contactless power transfer method by resonance coupling, when the wireless power transmitter 100 and electronic device 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the electronic device 200 including each coil is relatively smaller than the inductive coupling method.

Hereinafter, the configuration of a wireless power transmitter and an electronic device in the resonance coupling method applicable to the embodiments disclosed herein will be described in detail.

Figure 7A:
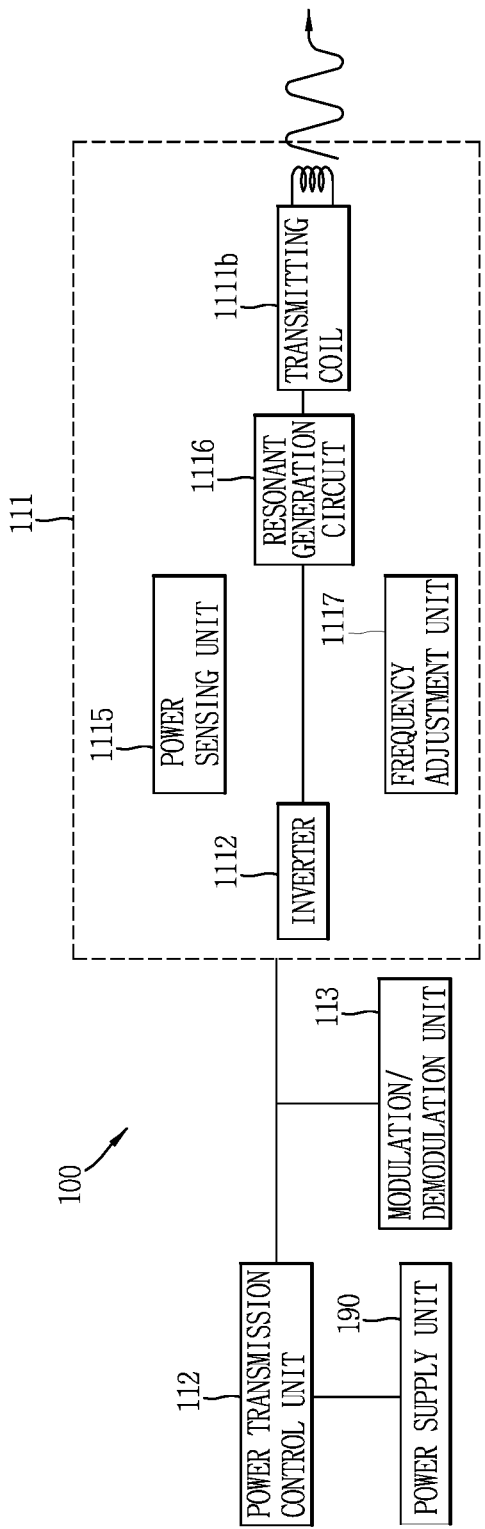
FIGS. 7A and 7B are block diagrams illustrating part of the wireless power transmitter 100 and electronic device 200 in a resonance method that can be employed in the embodiments disclosed herein.
Figure 7B:
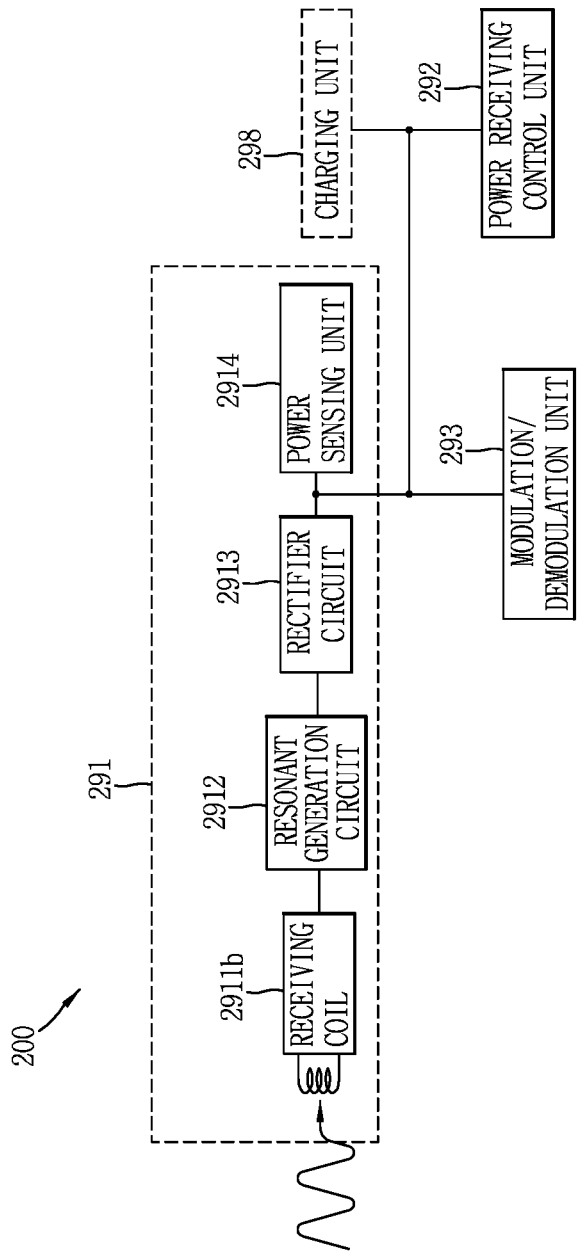

FIGS. 7A and 7B—Wireless Power Transmitter in Resonance Coupling Method

FIGS. 7A and 7B are block diagrams illustrating part of the wireless power transmitter 100 and electronic device 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit (or RESONANT GENERATION CIRCUIT) 1116. The inverter 1112 may be configured to be connected to the transmitting coil 1111b and the resonant circuit (or RESONANT GENERATION CIRCUIT) 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit (or RESONANT GENERATION CIRCUIT) 1116 generate resonance when alternating current power is applied thereto, and at this time, a vibration frequency may be determined based on an inductance of the transmitting coil 1111b and a capacitance of the resonant circuit (or RESONANT GENERATION CIRCUIT) 1116.

For this purpose, the inverter 1112 transforms a DC input obtained from the power supply unit 190 into an AC waveform, and the transformed AC current is applied to the transmitting coil 1111b and the resonant circuit (or RESONANT GENERATION CIRCUIT) 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit (or RESONANT GENERATION CIRCUIT) 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the electronic device 200 will be described. The power supply unit 290, as described above, may include the receiving (Rx) coil 2911b and resonant circuit 2912.

In addition, the power receiving unit 291 of the power supply unit 290 may further include a rectifier circuit 2913 for converting an AC current generated by resonance phenomenon into DC. The rectifier circuit 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

FIG. 8—Wireless Power Transmitter Configured to Include One or More Transmitting Coils FIG. 8 is a block diagram illustrating a wireless power transmitter configured to have one or more transmission coils receiving power according to an resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 11b-1 to 1111b-n, respectively.

In the meantime, when one or more electronic devices 200 are disposed in an active area or a detection area of the wireless power transmitter 100 including the one or more transmitting coils 1111b-1 to 1111b-n, the power transmission control unit 112 may control the multiplexer 1113 to allow the electronic devices to be placed in different resonance coupling relations. Accordingly, the wireless power transmitter 100 may wirelessly transfer power to the one or more electronic devices by generating the wireless power signal using different coils.

In addition, the power transmission control unit 112 may set power with a different characteristic to be supplied to each of the coils corresponding to the electronic devices.

Here, the wireless power transmitter 100 may transfer power by differently setting a power transmission scheme, a resonant frequency, efficiency, a characteristic and the like for each electronic device. The power transmission for one or more electronic devices will be described later with reference to FIG. 28. For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

Figure 9:
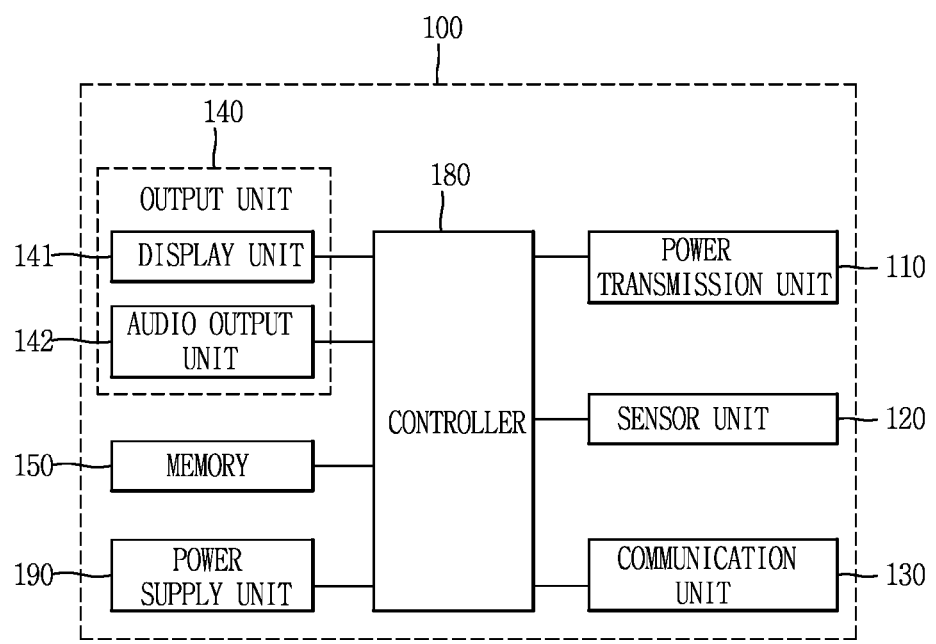
FIG. 9 is a block diagram illustrating a wireless power transmitter further including an additional element in addition to the configuration illustrated in FIG. 2A.

FIG. 9—Wireless Power Transmitter Implemented by Charger

On the other hand, hereinafter, an example of the wireless power transmitter implemented in the form of a wireless charger will be described.

FIG. 9 is a block diagram illustrating a wireless power transmitter further including an additional element in addition to the configuration illustrated in FIG. 2A.

Referring to FIG. 9, the wireless power transmitter 100 may further include a sensor unit 120, a communication unit 130, an output unit 140, a memory 150, and a control unit (or controller) 180 in addition to the power transmission unit 110 and power supply unit 190 for supporting at least one of the foregoing inductive coupling method and resonance coupling method.

The control unit (or controller) 180 controls the power transmission unit 110, the sensor unit 120, the communication unit 130, the output unit 140, the memory 150, and the power supply unit 190.

The control unit (or controller) 180 may be implemented by a module separated from the power transmission control unit 112 in the power transmission unit 110 described with reference to FIG. 2 or may be implemented by a single module.

The sensor unit 120 may include a sensor for detecting the location of the electronic device 200. The location information detected by the sensor unit 120 may be used for allowing the power transmission unit 110 to transfer power in an efficient manner.

For instance, in case of wireless power transfer according to the inductive coupling method, the sensor unit 120 may be operated as a detection unit, and the location information detected by the sensor unit 120 may be used to move or rotate the transmitting coil 1111a in the power transmission unit 110.

Furthermore, for example, the wireless power transmitter 100 configured to include the foregoing one or more transmitting coils may determine coils that can be placed in an inductive coupling relation or resonance coupling relation to the receiving coil of the electronic device 200 among the one or more transmitting coils based on the location information of the electronic device 200.

On the other hand, the sensor unit 120 may be configured to monitor whether or not the electronic device 200 approaches a chargeable region. The approach or non-approach detection function of the sensor unit 120 may be carried out separately from the function of allowing the power transmission control unit 112 in the power transmission unit 110 to detect the approach or non-approach of the electronic device 200.

The communication unit 130 performs wired or wireless data communication with the electronic device 200. The communication unit 130 may include an electronic component for at least any one of Bluetooth™, Zigbee, Ultra Wide Band (UWB), Wireless USB, Near Field Communication (NFC), and Wireless LAN.

The output unit 140 may include at least one of a display unit 141 and an audio output unit (or sound output unit) 142. The display unit 141 may include at least one of a liquid crystal display (LCD), a thin film transistor-liquid crystal display (TFT-LCD), an organic light-emitting diode (OLED), a flexible display, and a three-dimensional (3D) display. The display unit 141 may display a charging state under the control of the control unit (or controller) 180.

The memory 150 may include at least one storage medium of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The wireless power transmitter 100 may operate in association with a web storage performing the storage function of the memory 150 on the Internet. A program or commands performing the foregoing functions of the wireless power transmitter 100 may be stored in the memory 150. The control unit (or controller) 180 may perform the program or commands stored in the memory 150 to transmit power in a wireless manner. A memory controller (not shown) may be used to allow other constituent elements (e.g., control unit (or controller) 180) included in the wireless power transmitter 100 to access the memory 150.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

Figure 10:
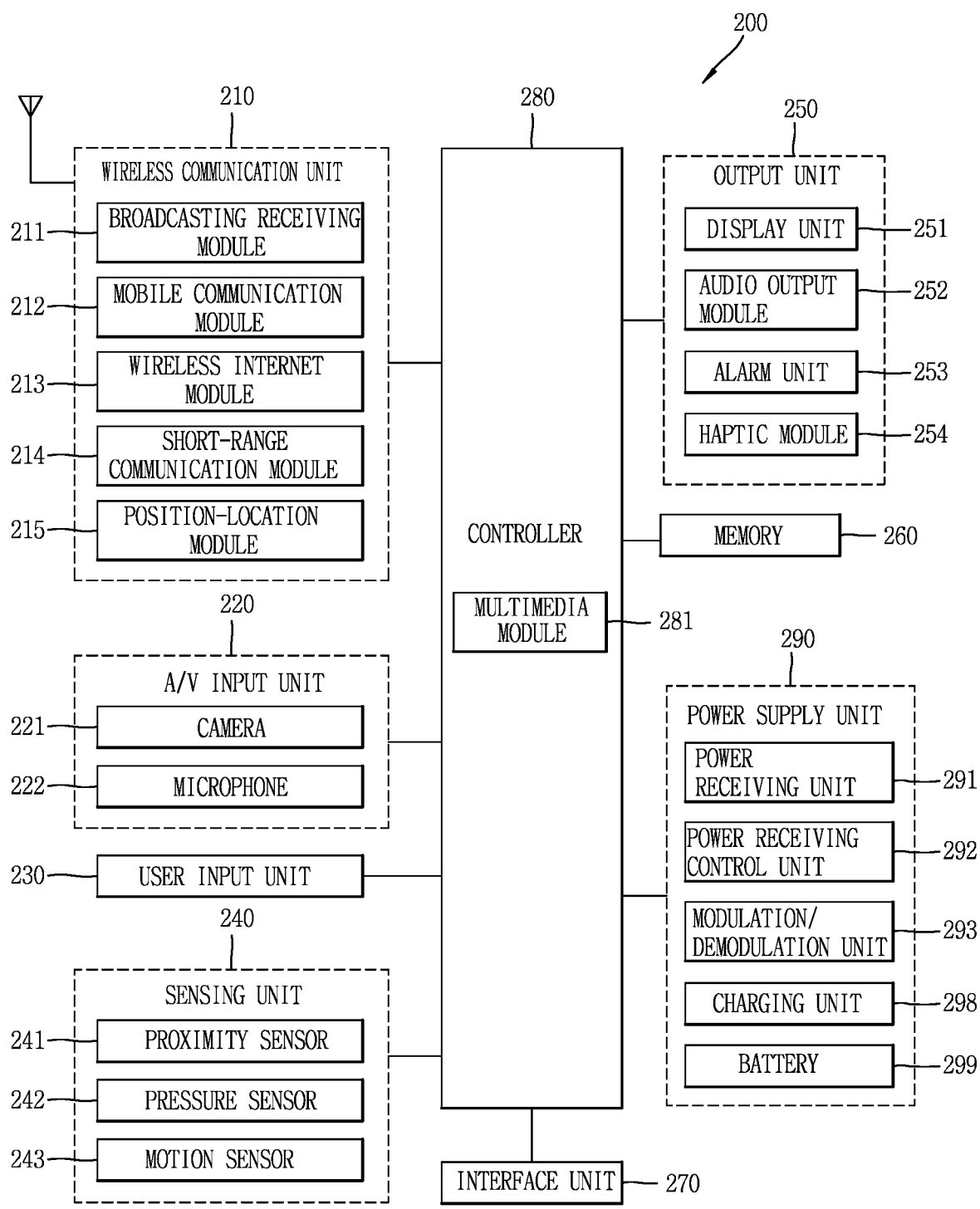
FIG. 10 is view illustrating a configuration in case where an electronic device 200 according to the embodiments disclosed herein is implemented in the form of a mobile terminal.

FIG. 10—Wireless Power Receiver Implemented with Mobile Terminal

FIG. 10 is view illustrating a configuration in case where an electronic device 200 according to the embodiments disclosed herein is implemented in the form of a mobile terminal.

The mobile communication terminal 200 may include a power supply unit 290 illustrated in FIG. 2, 4, or 7.

Furthermore, the terminal 200 may further include a wireless communication unit 210, an Audio/Video (AN) input unit 220, a user input unit 230, a sensing unit 240, an output unit 250, a memory 260, an interface unit 270, and a controller 280. FIG. 10 illustrates the terminal 100 having various components, but it is understood that implementing all of the illustrated components is not a requirement. Greater or fewer components may alternatively be implemented.

Hereinafter, each component is described in sequence.

The wireless communication unit 210 may typically include one or more modules which permit wireless communications between the terminal 200 and a wireless communication system or between the terminal 200 and a network within which the terminal 200 is located. For example, the wireless communication unit 210 may include a broadcast receiving module 211, a mobile communication module 212, a wireless internet module 213, a short-range communication module 214, a position location module 215 and the like.

The broadcast receiving module 211 receives a broadcast signal and/or broadcast associated information from an external broadcast managing entity via a broadcast channel.

The broadcast channel may include a satellite channel and a terrestrial channel. The broadcast center may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may denote information associated with a broadcast channel, a broadcast program, a broadcast service provider, and the like. The broadcast associated information may be provided via a mobile communication network. In this case, it may be received by the mobile communication module 212.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 211 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 211 may be configured to be suitable for every broadcast system transmitting broadcast signals as well as the digital broadcasting systems.

Broadcast signals and/or broadcast associated information received via the broadcast receiving module 211 may be stored in a suitable device, such as a memory 260.

The mobile communication module 212 transmits/receives wireless signals to/from at least any one of a base station, an external portable terminal, and a server on a mobile communication network. The wireless signal may include audio call signal, video (telephony) call signal, or various formats of data according to transmission/reception of text/multimedia messages.

The wireless internet module 213 supports wireless Internet access for the mobile terminal 200. This module may be internally or externally coupled to the terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 214 denotes a module for short-range communications. Suitable technologies for implementing this module may include Bluetooth, Radio Frequency IDentification (RFID), Infrared Data Association (IrDA), Ultra-WideBand (UWB), ZigBee, and the like. On the other hand, Universal Serial Bus (USB), IEEE 1394, Thunderbolt of Intel technology, and the like, may be used for wired short-range communication.

The wireless internet module 213 or the short-range communication module 214 may establish data communication connection to the wireless power transmitter 100.

Through the established data communication, when there is an audio signal to be outputted while transferring power in a wireless manner, the wireless internet module 213 or the short-range communication module 214 may transmit the audio signal to the wireless power transmitter 100 through the short-range communication module. Furthermore, through the established data communication, when there is information to be displayed, the wireless internet module 213 or the short-range communication module 214 may transmit the information to the wireless power transmitter 100. Otherwise, the wireless internet module 213 or the short-range communication module 214 may transmit an audio signal received through a microphone integrated in the wireless power transmitter 100. Furthermore, the wireless internet module 213 or the short-range communication module 214 may transmit the identification information (e.g., phone number or device name in case of a portable phone) of the mobile terminal 200 to the wireless power transmitter 100 through the established data communication.

The position location module 215 is a module for acquiring a position of the terminal. An example of the position location module 215 may include a Global Position System (GPS) module.

Referring to FIG. 10, the A/V input unit 220 is configured to provide audio or video signal input to the portable terminal. The A/V input unit 220 may include a camera 221 and a microphone 222. The camera 221 processes image frames of still or moving images obtained by an image sensor in a video call mode or a capture more. The processed image frames may be displayed on the display unit 251.

The image frames processed by the camera 221 may be stored in the memory 260 or transmitted to the exterior via the wireless communication unit 210. Two or more cameras 221 may be provided therein according to the use environment.

The microphone 222 may receive an external audio signal by a microphone in a phone call mode, a recording mode, a voice recognition mode, or the like to process it into electrical audio data. The processed audio data is converted and outputted into a format transmittable to a mobile communication base station via the mobile communication module 212 in case of the phone call mode. The microphone 222 may include various noise removal algorithms to remove noises generated while receiving the external audio signal.

The user input unit 230 may generate input data to allow the user to control the operation of the terminal. The user input unit 230 may include a keypad, a dome switch, a touchpad (e.g., static pressure/capacitance), a jog wheel, a jog switch and the like.

The sensing unit 240 may include a proximity sensor 241, a pressure sensor 242, a motion sensor 243, and the like. The proximity sensor 241 detects an object approaching the mobile terminal 200, or the presence or absence of an object existing adjacent to the mobile terminal 200, and the like without any mechanical contact. The proximity sensor 241 may detect a proximity object using a change of the AC magnetic field or static magnetic field, a change rate of the electrostatic capacity, or the like. Two or more proximity sensors 241 may be provided according to the aspect of configuration.

The pressure sensor 242 may detect whether or not a pressure is applied to the mobile terminal 200, a size of the pressure, and the like. The pressure sensor 242 may be provided at a portion where the detection of a pressure is required in the mobile terminal 200 according to the use environment. When the pressure sensor 242 is provided in the display unit 251, it may be possible to identify a touch input through the display unit 251 and a pressure touch input by which a pressure larger than the touch input is applied according to a signal outputted from the pressure sensor 242. Furthermore, it may be possible to know a size of the pressure applied to the display unit 251 during the input of a pressure touch.

The motion sensor 243 detects the location or movement of the mobile terminal 200 using an acceleration sensor, a gyro sensor, and the like. The acceleration sensor used in the motion sensor 243 is an element for converting an acceleration change in any one direction into an electrical signal. Two or three axes are typically integrated into a package to constitute an acceleration sensor, and only one Z-axis may be required according to the use environment. Accordingly, when an acceleration sensor in the direction of X-axis or Y-axis should be used instead of the direction of Z-axis due to any reason, the acceleration sensor may be erected and mounted on a main substrate using a separate piece substrate. Furthermore, the gyro sensor is a sensor for measuring an angular speed of the mobile terminal 200 in a rotational movement to detect a rotated angle with respect to each reference direction. For instance, the gyro sensor may detect each rotational angle, i.e., azimuth, pitch and roll, with reference to three directional axes.

The output unit 250 is provided to output visual, auditory, or tactile information. The output unit 250 may include a display unit 251, an audio output module 252, an alarm unit 253, a haptic module 254, and the like.

The display unit 251 may display (output) information processed in the terminal 200. For example, when the terminal is in a phone call mode, the display unit 251 will provide a User Interface (UI) or Graphic User Interface (GUI) associated with the call. When the terminal is in a video call mode or a capture mode, the display unit 251 may display images captured and/or received, UI, or GUI.

The display unit 251 may include at least one of a liquid crystal display (LCD), a thin film transistor-liquid crystal display (TFT-LCD), an organic light-emitting diode (OLED), a flexible display, a three-dimensional (3D) display, and the like.

Some of those displays may be configured as a transparent type or an light transmission type through which the outside is visible, which is referred to as a transparent display. A representative example of the transparent display may include a Transparent OLED (TOLED), or the like. The rear surface of the display unit 151 may also be implemented to be optically transparent. Under this configuration, the user can view an object positioned at a rear side of the terminal body through a region occupied by the display unit 251 of the terminal body.

The display unit 251 may be implemented in two or more in number according to a configured aspect of the terminal 200. For instance, a plurality of the display units 251 may be arranged on one surface to be spaced apart from or integrated with each other, or may be arranged on different surfaces.

Here, if the display unit 251 and a touch sensitive sensor (referred to as a touch sensor) have a layered structure therebetween, the display unit 251 may be used as an input device rather than an output device. The touch sensor may be implemented as a touch film, a touch sheet, a touch pad, and the like.

The touch sensor may be configured to convert changes of a pressure applied to a specific part of the display unit 251, or a capacitance occurring from a specific part of the display unit 251, into electric input signals. Also, the touch sensor may be configured to sense not only a touched position and a touched area, but also a touch pressure.

When touch inputs are sensed by the touch sensors, corresponding signals are sent to a touch controller. The touch controller processes the received signals, and then transmits corresponding data to the controller 280. Accordingly, the controller 280 may sense which region of the display unit 151 has been touched.

The proximity sensor 241 may be arranged at an inner region of the terminal covered by the touch screen, or near the touch screen. The proximity sensor refers to a sensor to sense the presence or absence of an object approaching a surface to be sensed, or an object disposed near a surface to be sensed, using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as a "proximity touch", whereas a status that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 252 may output audio data received from the wireless communication unit 210 or stored in the memory 260, in a call-receiving mode, a call-placing mode, a recording mode, a voice recognition mode, a broadcast reception mode, and so on. The audio output module 252 may output audio signals relating to functions performed in the terminal 200, e.g., sound alarming a call received or a message received, and so on. The audio output module 252 may include a receiver, a speaker, a buzzer, and so on.

The alarm 253 outputs signals notifying the occurrence of an event from the terminal 200. The event occurring from the terminal 100 may include call received, message received, key signal input, touch input, and so on. The alarm 253 may output not only video or audio signals, but also other types of signals such as signals notifying occurrence of events in a vibration manner. Since the video or audio signals can be output through the display unit 251 or the audio output unit 252, the display unit 251 and the audio output module 252 may be categorized into part of the alarm 253.

The haptic module 254 generates various tactile effects which a user can feel. A representative example of the tactile effects generated by the haptic module 254 includes vibration. Vibration generated by the haptic module 254 may have a controllable intensity, a controllable pattern, and so on. For instance, different vibration may be output in a synthesized manner or in a sequential manner.

The haptic module 254 may generate various tactile effects, including not only vibration, but also arrangement of pins vertically moving with respect to a skin being contacted, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 254 may be configured to transmit tactile effects through the user's direct contact, or the user's muscular sense using a finger or a hand. The haptic module 254 may be implemented in two or more in number according to the configuration of the terminal 200.

The memory 260 may store a program for the processing and control of the controller 280. Alternatively, the memory 260 may temporarily store input/output data (e.g., phonebook data, messages, still images, video and the like). Also, the memory 260 may store data related to various patterns of vibrations and audio output upon the touch input on the touch screen.

In some embodiments, software components including an operating system (not shown), a module performing a wireless communication unit 210 function, a module operating together with the user input unit 230, a module operating together with the A/V input unit 220, a module operating together with the output unit 250 may be stored in the memory 260. The operating system (e.g., LINUX, UNIX, OS X, WINDOWS, Chrome, Symbian, iOS, Android, VxWorks, or other embedded operating systems) may include various software components and/or drivers to control system tasks such as memory management, power management, and the like.

In addition, the memory 260 may store a setup program associated with contactless power transfer or wireless charging. The setup program may be implemented by the controller 280.

Furthermore, the memory 260 may store an application associated with contactless power transfer (or wireless charging) downloaded from an application providing server (for example, an app store). The wireless charging related application is a program for controlling wireless charging transmission, and thus the electronic device 200 may receive power from the wireless power transmitter 100 in a wireless manner or establish connection for data communication with the wireless power transmitter 100 through the relevant program.

The memory 260 may be implemented using any type of suitable storage medium including a flash memory type, a hard disk type, a multimedia card micro type, a memory card type (e.g., SD or xD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Also, the terminal 200 may be operated in association with a web storage performing the storage function of the memory 160 on the Internet.

The interface unit 270 may generally be implemented to interface the portable terminal with all external devices. The interface unit 270 may allow a data reception from an external device, a power delivery to each component in the terminal 200, or a data transmission from the terminal 200 to an external device. The interface unit 270 may include, for example, wired/wireless headset ports, external charger ports, wired/wireless data ports, memory card ports, ports for coupling devices having an identification module, audio input/output (I/O) ports, video input/output (I/O) ports, earphone ports, and the like.

The identification module may be configured as a chip for storing various information required to authenticate an authority to use the terminal 200, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the terminal 200 via a port.

Also, the interface unit may serve as a path for power to be supplied from an external cradle to the terminal 200 when the terminal 100 is connected to the external cradle or as a path for transferring various command signals inputted from the cradle by a user to the terminal 200. Such various command signals or power inputted from the cradle may operate as signals for recognizing that the terminal 200 has accurately been mounted to the cradle.

The controller 280 typically controls the overall operations of the terminal 200. For example, the controller 280 performs the control and processing associated with telephony calls, data communications, video calls, and the like. The controller 280 may include a multimedia module 281 for multimedia playback. The multimedia module 281 may be implemented within the controller 280, or implemented separately from the controller 280.

The controller 280 can perform a pattern recognition processing so as to recognize a writing input or image drawing input carried out on the touch screen as a text or image.

The controller 280 performs wired or wireless charging according to the user input or internal input. Here, the internal input represents a signal for notifying that an induced current generated from a secondary coil within the terminal has been detected.

When the foregoing wireless charging is carried out, an operation of allowing the controller 280 to control each constituent element will be described in detail below with reference to the operation phase in FIG. 14. As described above, the power reception control unit (or power receiving control unit) 292 within the power supply unit 290 may be implemented to be included in the controller 280, and in the present disclosure, it should be understood that the controller 280 performs the operation by the power reception control unit (or power receiving control unit) 292.

The power supply unit 290 receives internal and external power under the control of the controller 280 to supply power required for the operation of each constituent element.

The power supply unit 290 is provided with a battery 299 for supplying power to each constituent element of the terminal 200, and the battery 299 may include a charger 298 for performing wired or wireless charging.

The present disclosure discloses a mobile terminal as an example of the apparatus for receiving power in a wireless manner, but it would be easily understood by those skilled in the art that the configuration according to the embodiment disclosed herein may be applicable to a stationary terminal, such as a digital TV, a desktop computer, and the like, excluding a case where it is applicable to only the mobile terminal.

Figure 11A:
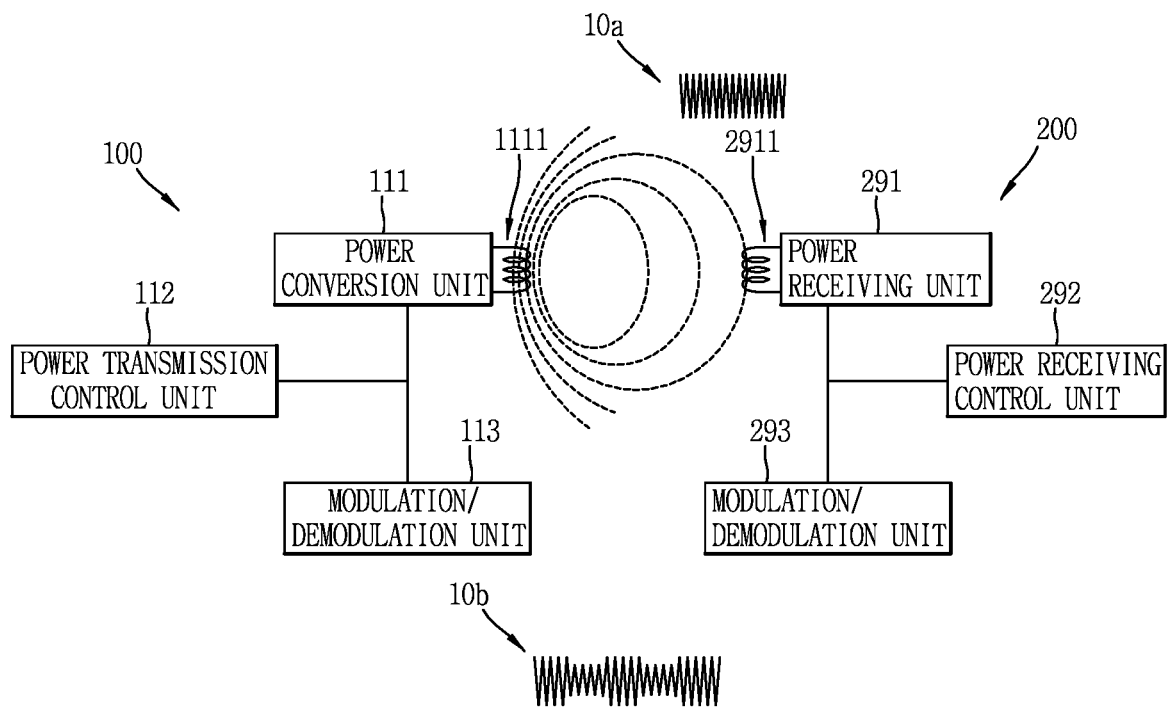
FIGS. 11A and 11B are views illustrating the concept of transmitting and receiving a packet between a wireless power transmitter and an electronic device through the modulation and demodulation of a wireless power signal in transferring power in a wireless manner disclosed herein.
Figure 11B:
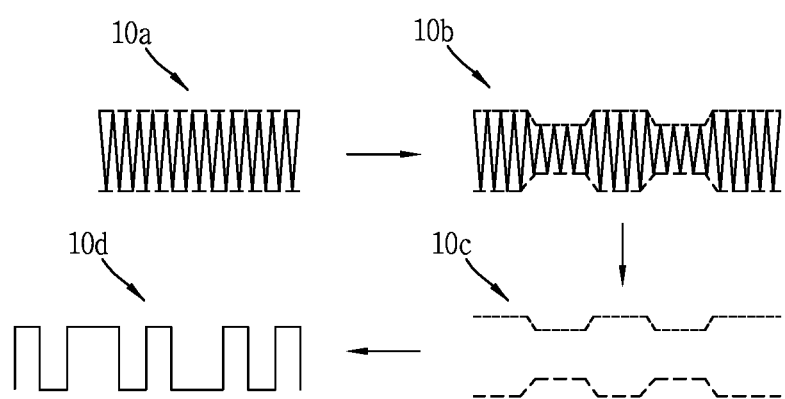

FIGS. 11A and 11B—Backscatter Modulation

FIGS. 11A and 11B are a view illustrating the concept of transmitting and receiving a packet between a wireless power transmitter and an electronic device through the modulation and demodulation of a wireless power signal in transferring power in a wireless manner disclosed herein.

Referring to FIG. 11A, the wireless power signal formed by the power conversion unit 111 forms a closed-loop within a magnetic field or electromagnetic field, and therefore, when the electronic device 200 modulates the wireless power signal while receiving the wireless power signal, the wireless power transmitter 100 may detect the modulated wireless power signal. The power communications modulation/demodulation unit 113 may demodulate the detected wireless power signal, and decodes the packet from the modulated wireless power signal.

On the other hand, a modulation method used for communication between the wireless power transmitter 100 and the electronic device 200 may be amplitude modulation. As described above, the amplitude modulation method may be a backscatter modulation method in which the power communications modulation/demodulation unit 293 at the side of the electronic device 200 changes an amplitude of the wireless power signal 10a formed by the power conversion unit 111 and the power reception control unit (or or power receiving control unit) 292 at the side of the wireless power transmitter 100 detects an amplitude of the modulated wireless power signal 10b.

Specifically, further referring to FIG. 11B, the power reception control unit (or or power receiving control unit) 292 at the side of the electronic device 200 modulates the wireless power signal 10a received through the power receiving unit 291 by changing a load impedance within the power communications modulation/demodulation unit 293. The power reception control unit (or power receiving control unit) 292 modulates the wireless power signal 10a to include a packet including a power control message to be transmitted to the wireless power transmitter 100.

Then, the power transmission control unit 112 at the side of the wireless power transmitter 100 demodulates the modulated wireless power signal 10b through an envelope detection process, and decodes the detected signal 10c into digital data 10d. The demodulation process detects a current or voltage flowing into the power conversion unit 111 to be classified into two states, a HI phase and a LO phase, and acquires a packet to be transmitted by the electronic device 200 based on digital data classified according to the states.

Hereinafter, a process of allowing the wireless power transmitter 100 to acquire a power control message to be transmitted by the electronic device 200 from the demodulated digital data will be described.

Figure 12A:
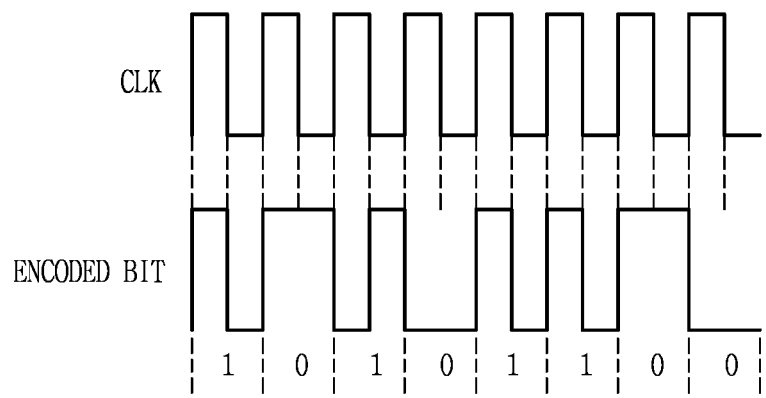
FIGS. 12A and 12B are views illustrating a method of showing data bits and byte constituting a power control message provided by the wireless power transmitter 100.
Figure 12B:
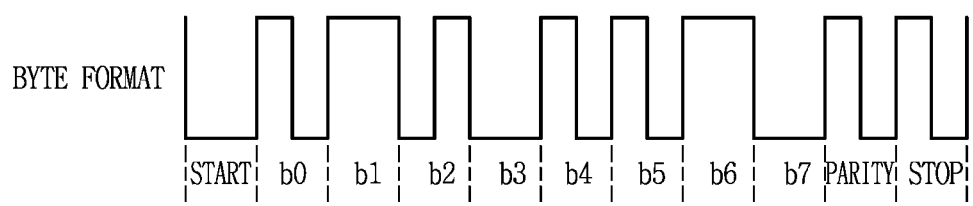

FIGS. 12A and 12B—Bit Encoding, Byte Format

FIGS. 12A and 12B are a view illustrating a method of showing data bits and byte constituting a power control message provided by the wireless power transmitter 100.

Referring to FIG. 12A, the power transmission control unit 112 detects an encoded bit using a clock signal (CLK) from an envelope detected signal. The detected encoded bit is encoded according to a bit encoding method used in the modulation process at the side of the electronic device 200. The bit encoding method may correspond to any one of non-return to zero (NRZ) and bi-phase encoding.

For instance, the detected bit may be a differential bi-phase (DBP) encoded bit. According to the DBP encoding, the power reception control unit (or or power receiving control unit) 292 at the side of the electronic device 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using a 11-bit asynchronous serial format as illustrated in FIG. 12C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

Figure 13:
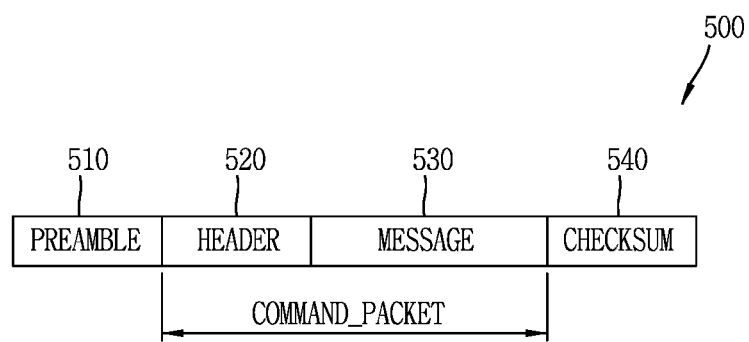
FIG. 13 is a view illustrating a packet including a power control message used in a contactless (wireless) power transfer method according to the embodiments disclosed herein.

FIG. 13—Packet Format

FIG. 13 is a view illustrating a packet including a power control message used in a contactless power transfer method according to the embodiments disclosed herein.

The packet 500 may include a preamble 510, a header 520, a message 530, and a checksum 540.

The preamble 510 may be used to perform synchronization with data received by the wireless power transmitter 100 and detect the start bit of the header 520. The preamble 510 may be configured to repeat the same bit. For instance, the preamble 510 may be configured such that data bit 1 according to the DBP encoding is repeated eleven to twenty five times.

The header 520 may be used to indicate a type of the packet 500. A size of the message 530 and the kind thereof may be determined based on a value indicated by the header 520. The header 520 is a value having a predetermined size to be positioned subsequent to the preamble 510. For instance, the header 520 may be a byte in size.

The message 530 may be configured to include data determined based on the header 520. The message 530 has a predetermined size according to the kind thereof.

The checksum 540 may be used to detect an error that can be occurred in the header 520 and the message 530 while transmitting a power control message. The header 520 and the message 530 excluding the preamble 510 for synchronization and the checksum 540 for error checking may be referred to as command-packet.

Figure 14:
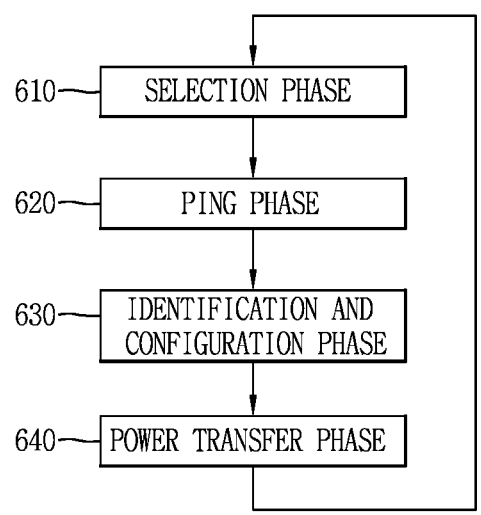
FIG. 14 is a view illustrating the operation phases of the wireless power transmitter 100 and electronic device 200 according to the embodiments disclosed herein.

FIG. 14—Operation Phases

Hereinafter, description will be given of operation phases of the wireless power transmitter 100 and the electronic device 200.

FIG. 14 illustrates the operation phases of the wireless power transmitter 100 and electronic device 200 according to the embodiments disclosed herein. Furthermore, FIGS. 15 through 20 illustrate the structure of packets including a power control message between the wireless power transmitter 100 and electronic device 200.

Referring to FIG. 14, the operation phases of the wireless power transmitter 100 and the electronic device 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection state 610, and the wireless power transmitter 100 sends a detection signal to the detected object and the electronic device 200 sends a response to the detection signal in the ping state 620.

Furthermore, the wireless power transmitter 100 identifies the electronic device 200 selected through the previous states and acquires configuration information for power transmission in the identification and configuration state 630. The wireless power transmitter 100 transmits power to the electronic device 200 while controlling power transmitted in response to a control message received from the electronic device 200 in the power transfer state 640.

Hereinafter, each of the operation phases will be described in detail.

1) Selection State

The wireless power transmitter 100 in the selection state 610 performs a detection process to select the electronic device 200 existing within a detection area. The detection area, as described above, refers to a region in which an object within the relevant area can affect on the characteristic of the power of the power conversion unit 111. Compared to the ping state 620, the detection process for selecting the electronic device 200 in the selection state 610 is a process of detecting a change of the power amount for forming a wireless power signal in the power conversion unit at the side of the wireless power transmitter 100 to check whether any object exists within a predetermined range, instead of the scheme of receiving a response from the electronic device 200 using a power control message. The detection process in the selection state 610 may be referred to as an analog ping process in the aspect of detecting an object using a wireless power signal without using a packet in a digital format in the ping state 620 which will be described later.

The wireless power transmitter 100 in the selection state 610 can detect that an object comes in or out within the detection area. Furthermore, the wireless power transmitter 100 can distinguish the electronic device 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection state 610 may be different from one another.

First, in case where power is transmitted according to the inductive coupling method, the wireless power transmitter 100 in the selection state 610 can monitor an interface surface (not shown) to detect the alignment and removal of objects.

Furthermore, the wireless power transmitter 100 may detect the location of the electronic device 200 placed on an upper portion of the interface surface. As described above, the wireless power transmitter 100 formed to include one or more transmitting coils may perform the process of entering the ping state 620 in the selection state 610, and checking whether or not a response to the detection signal is transmitted from the object using each coil in the ping state 620 or subsequently entering the identification state 630 to check whether identification information is transmitted from the object. The wireless power transmitter 100 may determine a coil to be used for contactless power transfer based on the detected location of the electronic device 200 acquired through the foregoing process.

Furthermore, when power is transmitted according to the resonance coupling method, the wireless power transmitter 100 in the selection state 610 can detect an object by detecting that any one of a frequency, a current and a voltage of the power conversion unit is changed due to an object located within the detection area.

On the other hand, the wireless power transmitter 100 in the selection state 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection state 610 and a wireless power signal formed to perform digital detection, identification, configuration and power transmission in the subsequent states 620, 630, 640 may have a different characteristic in the frequency, strength, and the like. It is because the selection state 610 of the wireless power transmitter 100 corresponds to an idle state for detecting an object, thereby allowing the wireless power transmitter 100 to reduce consumption power in the idle state or generate a specialized signal for effectively detecting an object.

2) Ping State

The wireless power transmitter 100 in the ping state 620 performs a process of detecting the electronic device 200 existing within the detection area through a power control message. Compared to the detection process of the electronic device 200 using a characteristic of the wireless power signal and the like in the selection state 610, the detection process in the ping state 620 may be referred to as a digital ping process.

The wireless power transmitter 100 in the ping state 620 forms a wireless power signal to detect the electronic device 200, modulates the wireless power signal modulated by the electronic device 200, and acquires a power control message in a digital data format corresponding to a response to the detection signal from the modulated wireless power signal. The wireless power transmitter 100 may receive a power control message corresponding to the response to the detection signal to recognize the electronic device 200 which is a subject of power transmission.

The detection signal formed to allowing the wireless power transmitter 100 in the ping state 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the electronic device 200.

Figure 15:
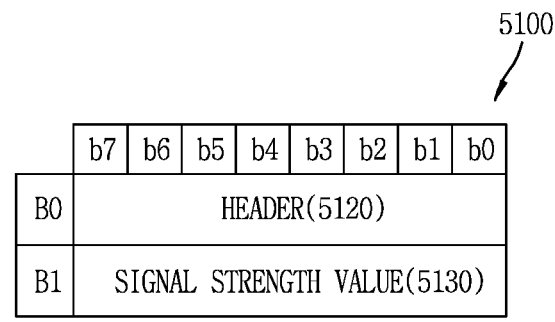
FIGS. 15, 16A, 16B and 17-19 are views illustrating the structure of packets including a power control message between the wireless power transmitter 100 and electronic device 200.

On the other hand, the power control message corresponding to a response to the detection signal may be a message indicating a strength of the wireless power signal received by the electronic device 200. For example, the electronic device 200 may transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating a strength of the power signal received by the electronic device 200. The strength of the power signal within the message 5130 may be a value indicating a degree of inductive coupling or resonance coupling for power transmission between the wireless power transmitter 100 and the electronic device 200.

The wireless power transmitter 100 may receive a response message to the detection signal to find the electronic device 200, and then extend the digital detection process to enter the identification and configuration state 630. In other words, the wireless power transmitter 100 maintains the power signal at a specific operating point subsequent to finding the electronic device 200 to receive a power control message required in the identification and configuration state 630.

However, if the wireless power transmitter 100 is not able to find the electronic device 200 to which power can be transferred, then the operation phase of the wireless power transmitter 100 will be returned to the selection state 610.

3) Identification and Configuration State

The wireless power transmitter 100 in the identification and configuration state 630 may receive identification information and/or configuration information transmitted by the electronic device 200, thereby controlling power transmission to be effectively carried out.

Figure 16A:
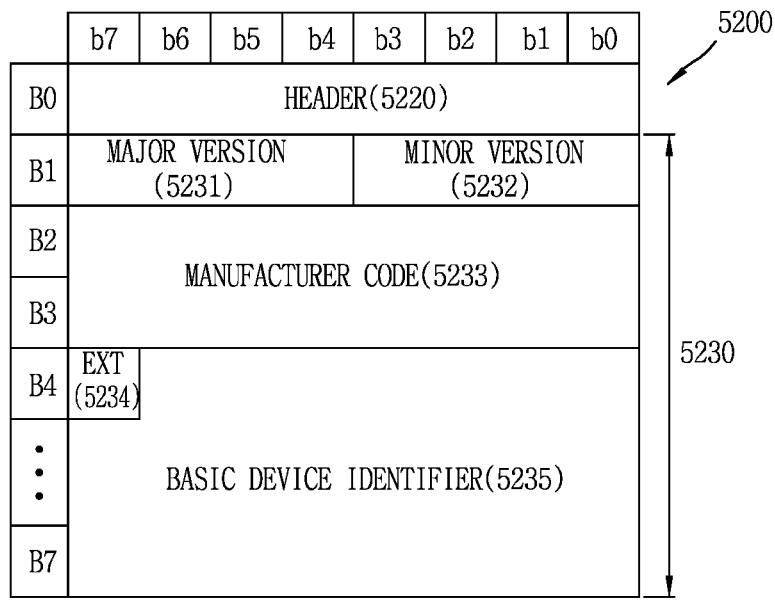
Figure 16B:
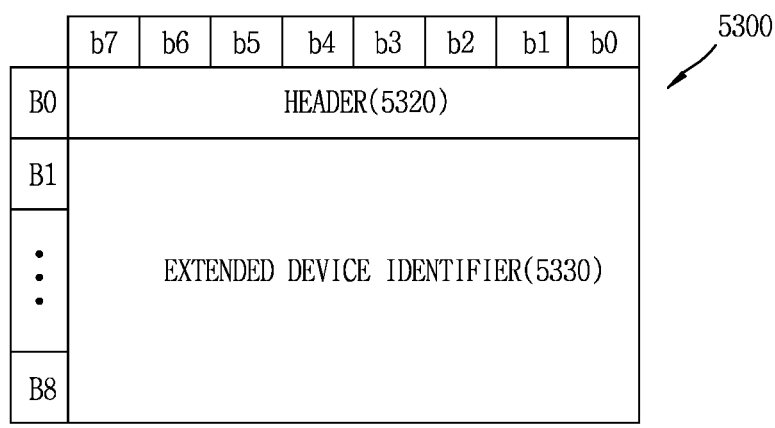

The electronic device 200 in the identification and configuration state 630 may transmit a power control message including its own identification information. For this purpose, the electronic device 200, for instance, may transmit an identification packet 5200 including a message indicating the identification information of the electronic device 200 as illustrated in FIG. 16A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the electronic device 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 16B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the electronic device 200.

Figure 17:
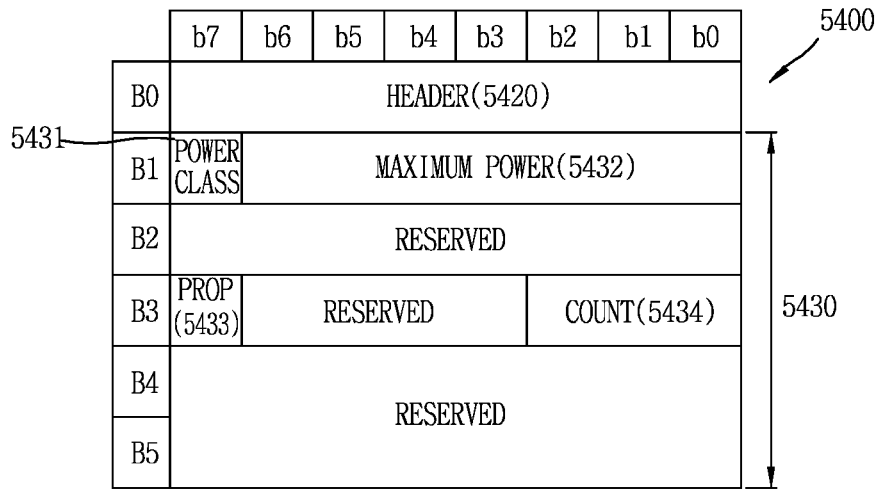

The electronic device 200 may transmit a power control message including information on expected maximum power in the identification and configuration state 630. To this end, the electronic device 200, for instance, may transmit a configuration packet 5400 as illustrated in FIG. 17. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

Meanwhile, the electronic device 200 according to the exemplary embodiments may transmit a power control message, which includes required power information thereof and associated profile information, to the wireless power transmitter 100. In some exemplary embodiments, the required power information related to the electronic device 200 or the profile information may be transmitted by being included in the configuration packet 5400 as illustrated in FIG. 17. Alternatively, the required power information related to the electronic device 200 or the profile information may be transmitted by being included in a separate packet for configuration.

On the other hand, the wireless power transmitter 100 may generate a power transfer contract which is used for power charging with the electronic device 200 based on the identification information and/or configuration information. The power transfer contract may include the limits of parameters determining a power transfer characteristic in the power transfer state 640.

The wireless power transmitter 100 may terminate the identification and configuration state 630 and return to the selection state 610 prior to entering the power transfer state 640. For instance, the wireless power transmitter 100 may terminate the identification and configuration state 630 to find another electronic device that can receive power in a wireless manner.

4) Power Transfer State

The wireless power transmitter 100 in the power transfer state 640 transmits power to the electronic device 200.

Figure 18:
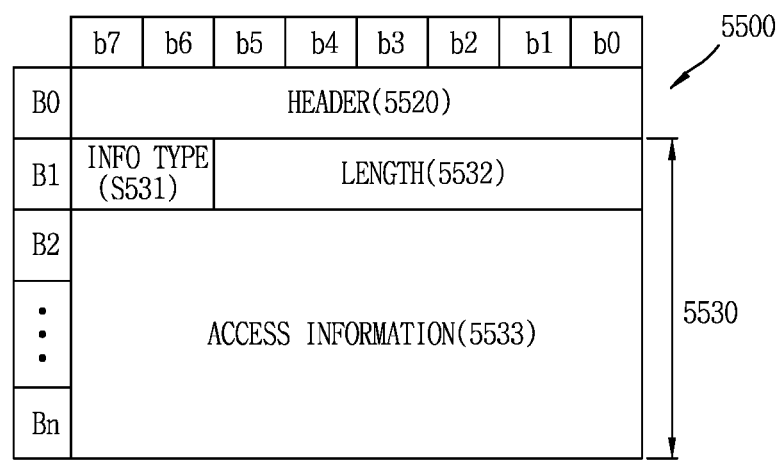
Figure 19:
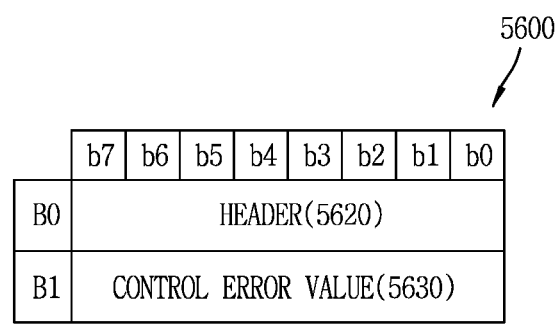

The wireless power transmitter 100 may receive a power control message from the electronic device 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0", reduced if the control error value is a negative value, and increased if the control error value is a positive value.

The wireless power transmitter 100 may monitor parameters within a power transfer contract generated based on the identification information and/or configuration information in the power transfer state 640. As a result of monitoring the parameters, if power transmission to the electronic device 200 violates the limits included in the power transfer contract, then the wireless power transmitter 100 may cancel the power transmission and return to the selection state 610.

The wireless power transmitter 100 may terminate the power transfer state 640 based on a power control message transferred from the electronic device 200.

For example, if the charging of a battery has been completed while charging the battery using power transferred by the electronic device 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection state 610.

For another example, the electronic device 200 may transfer a power control message for requesting renegotiation or reconfiguration to update the previously generated power transfer contract. The electronic device 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration state 630.

Figure 20:
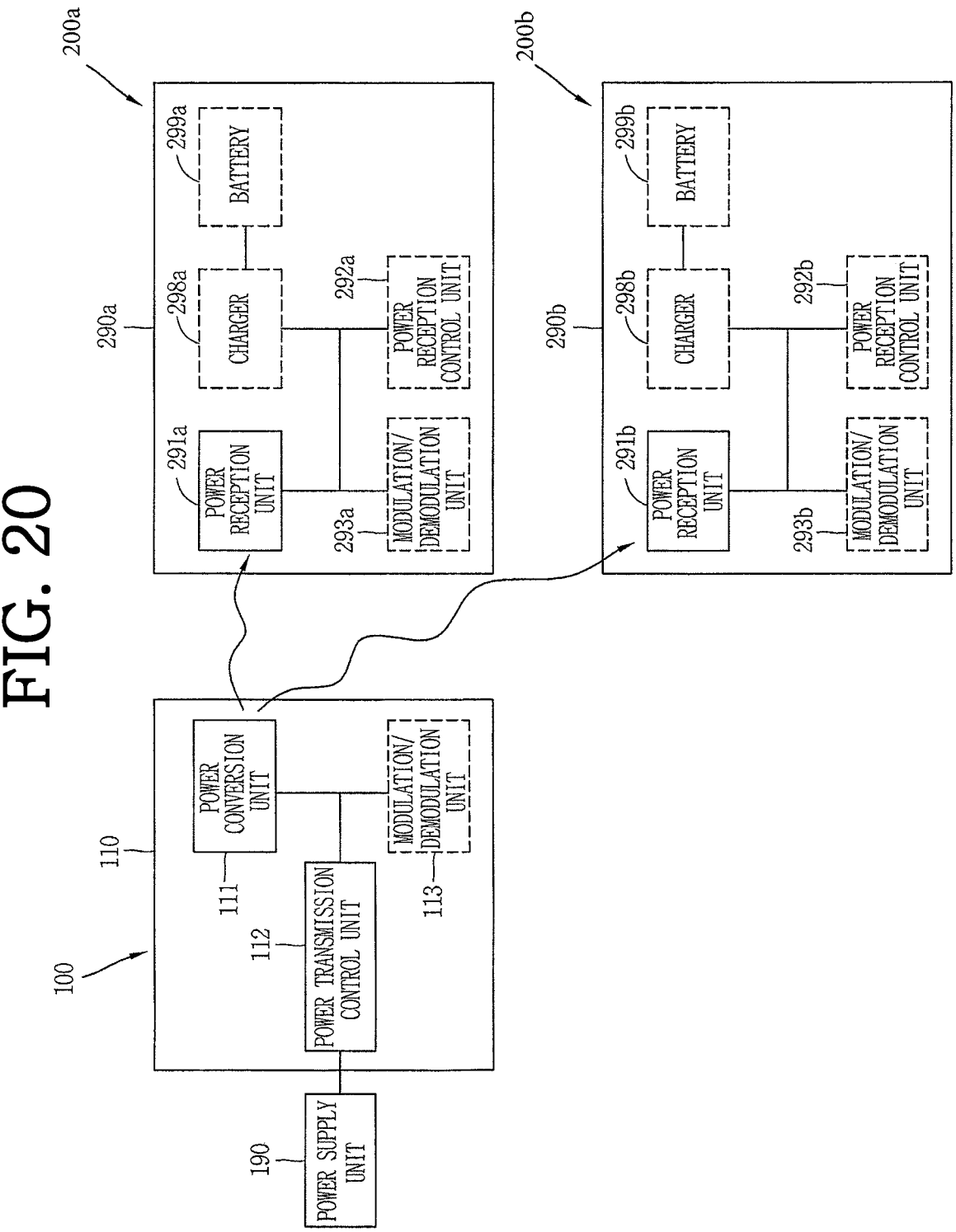
FIG. 20 is a view illustrating a unidirectional communication structure between a wireless power transmitter and a plurality of electronic devices.

To this end, a message transmitted by the electronic device 200, for instance, may be an end power transfer packet 5600 as illustrated in FIG. 20. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Unidirectional Communication Structure Between Wireless Power Transmitter and a Plurality of Electronic Devices FIG. 20 is a view illustrating a unidirectional communication structure between a wireless power transmitter and a plurality of electronic device.

FIG. 20 illustrates an example that the plurality of electronic devices include two devices, namely, a first electronic device 200a and a second electronic device 200b.

Referring to FIG. 20, the wireless power transmitter 100 may include a power transmission unit 110. The power transmission unit may include a power conversion unit 111 and a power transmission control unit 112.

The power conversion unit 111 may transfer power supplied from a transmission side power supply unit 190 to the electronic device 200 by converting it into a wireless power signal. The power conversion unit 111 may transfer the wireless power signal simultaneously to the first and second electronic devices 200a and 200b as the plurality of electronic devices.

In one exemplary embodiment, the power conversion unit 111 may include at least one primary coil for forming a changing magnetic field to induce a current to a secondary coil of each of first electronic device 200a and the second electronic device 200b.

In one exemplary embodiment, the power conversion unit 111 may include at least one coil (or antenna) for forming a magnetic field having at least one resonant frequency to induce a resonance phenomenon in the first electronic device 200a and the second electronic device 200b according to a resonance coupling method.

The first electronic device 200a and the second electronic device 200b may include power supply units 290a and 290b, respectively. The power supply units 290a and 290b may supply power required for driving the first electronic device 200a and the second electronic device 200b. The power supply unit 290a, 290b may include a power receiving unit 291a, 291b and a power reception control unit (or or power receiving control unit) 292a, 292b.

The power receiving unit 291a, 291b may receive power transferred from the wireless power transmitter 100 in a wireless manner. To this end, the power receiving unit 291a, 291b may include one or more coils for receiving a wireless power signal transferred in the form of a magnetic field or electromagnetic field having a vibration characteristic.

In one exemplary embodiment, the power receiving unit 291a, 291b may include a constituent element according to the inductive coupling method, namely, at least one secondary coil to which a current is induced by a changing magnetic field.

In one exemplary embodiment, the power receiving unit 291a, 291b may include constituent elements according to the resonance coupling method, namely, at least one coil and at least one resonant circuit in which resonance phenomenon is generated by a magnetic field having at least one resonant frequency.

To wirelessly supply power to the first electronic device 200a and the second electronic device 200b, the wireless power transmitter 100 may receive information related to the first electronic device 200a and the second electronic device 200b. The information related to the first electronic device 200a and the second electronic device 200b may be transmitted via a power control message in a digital data format.

For the transmission of the power control message in the digital data format, the power reception control unit (or power receiving control unit) 292a, 292b may modulate the wireless power signal to include a packet, which includes the power control message, while receiving the wireless power signal. Hereinafter, the modulated wireless power signal may be referred to as a response signal.

The wireless power transmitter 100 may sense the modulated wireless power signal. Here, the wireless power transmitter 100 may demodulate the sensed wireless power signal, and decode the packet from the demodulated wireless power signal.

Meanwhile, the wireless power transmitter 100 may employ an amplitude modulation as a modulation method for communication with the first electronic device 200a and the second electronic device 200b.

As described above, the amplitude modulation method may be a backscatter modulation method in which modulation/demodulation units 293a and 293b at the side of the first electronic device 200a and the second electronic device 200b change an amplitude of the wireless power signal formed by the wireless power transmitter 100 and a modulation/demodulation unit 113 at the side of the wireless power transmitter 100 detects an amplitude of the modulated wireless power signal.

In accordance with one exemplary embodiment, the wireless power transmitter 100 in the ping phase 620 may form the wireless power signal to detect the first electronic device 200a and the second electronic device 200b, demodulate the wireless power signal modulated by each of the first electronic device 200a and the second electronic device 200b, and acquire power control messages in the digital data format corresponding to responses to the wireless power signal from the demodulated wireless power signals.

The wireless power transmitter 100 may receive the power control messages corresponding to the responses to the wireless power signal to recognize the first electronic device 200a and the second electronic device 200b which are subjects of power transfer.

In one exemplary embodiment, the wireless power transmitter 100 in the identification and configuration phase 630 may receive identification information and/or configuration information transmitted from the first electronic device 200a and the second electronic device 200b, thereby controlling an efficient power transfer to be carried out.

Each of the first electronic device 200a and the second electronic device 200b in the identification and configuration phase 630 may transmit a power control message including its own identification information.

Therefore, in order to supply power in a wireless manner to the first electronic device 200a and the second electronic device 200b, it may be important that the wireless power transmitter 100 receives the information related to each of the first electronic device 200a and the second electronic device 200b without an error.

Thus, in order for the wireless power transmitter 100 to receive the information on the first electronic device 200a and the second electronic device 200b without an error, a collision between response signals transmitted by the first electronic device 200a and the second electronic device 200b should not occur.

Hereinafter, a collision probability and a collision process between the response signals transmitted by the first electronic device 200a and the second electronic device 200b will be described with reference to FIGS. 21 and 22.

Figure 21:
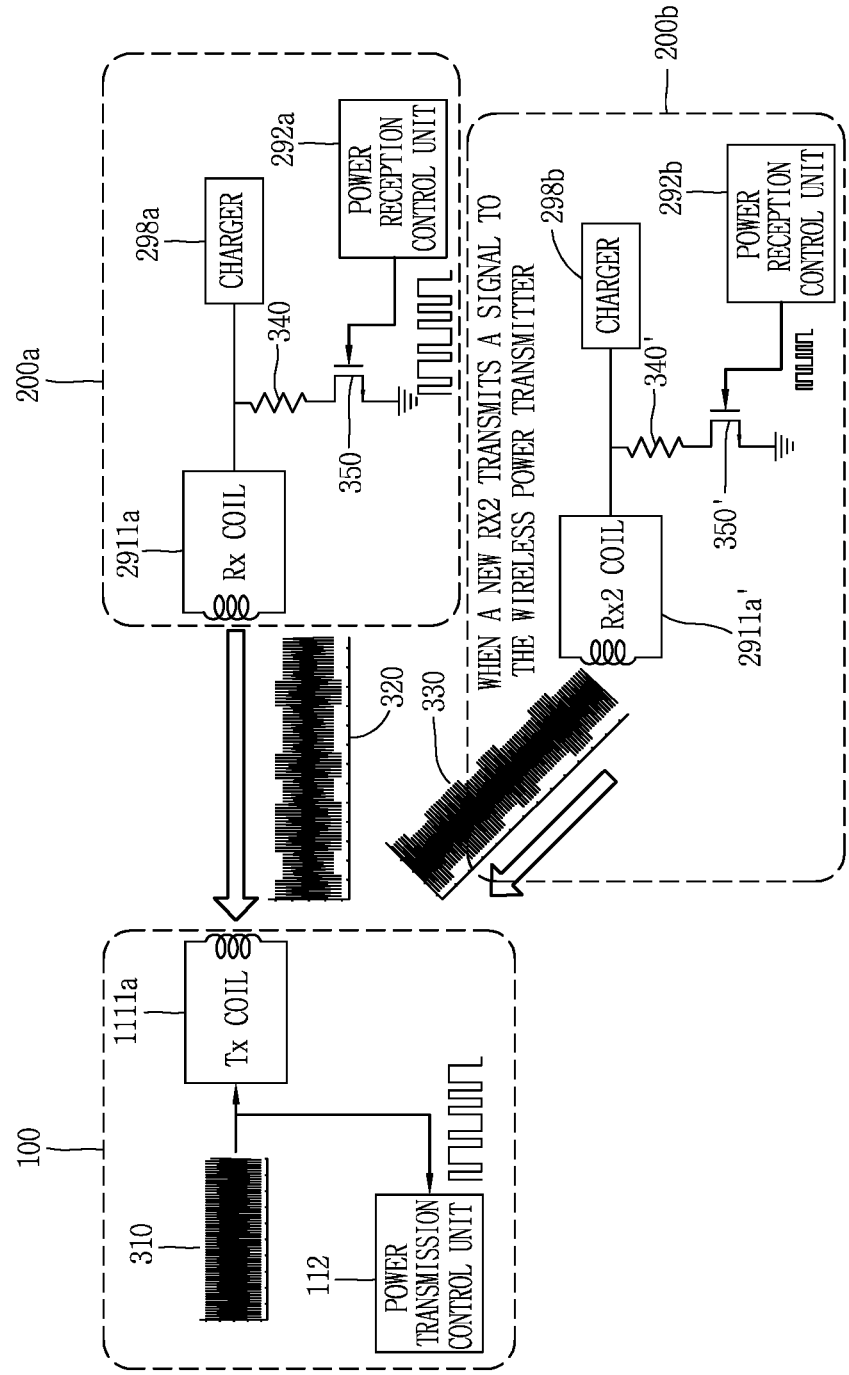
FIG. 21 is an exemplary view illustrating possibility of collision between response signals of the plurality of electronic devices in the unidirectional communication between the wireless power transmitter and the plurality of electronic devices.

FIG. 21 is an exemplary view illustrating possibility of collision between response signals of a plurality of electronic devices in a unidirectional communication between a wireless power transmitter and the plurality of electronic devices.

Referring to FIG. 21, the power conversion unit 111 may include an inverter 1112. The inverter 1112 may transform a DC input obtained from the power supply unit 190 into an AC waveform 310.

The AC current 310 transformed by the inverter 1112 may drive a resonant circuit including the transmitting coil 1111a (or 1111b for the resonance coupling method) and a capacitor (not shown) to form a magnetic field in the transmitting coil 1111a (or 1111b for the resonance coupling method).

The power reception control units 292a and 292b at the side of the respective first and second electronic devices 200a and 200b may modulate the wireless power signal by changing a load impedance within the respective modulation/demodulation units 293a and 293b. The load impedance may include a passive device and an active device. For example, the passive device may be a resistance, and the active device may be a transistor. FIG. 21 illustrates the case where the first electronic device 200a and the second electronic device 200b may include resistance 340 and 340' and transistors 350 and 350', respectively.

When the first electronic device 200a and the second electronic device 200b simultaneously transmit response signals 320 and 330 to the wireless power transmitter 100, a problem of collision between the modulated wireless power signals may be caused in the backscatter unidirectional communication.

That is, when the response signals 320 and 330 are transmitted within the same time interval, waveforms of the modulated wireless power signals 320 and 330 may overlap each other, which may cause a distortion of the waveforms. Accordingly, the wireless power transmitter 100 may not decode the response signals into digital data, resulting in impossibility of acquiring the power control messages in the digital data format.

Hereinafter, a process that response signals of a plurality of electronic devices collide with each other will be described in detail with reference to FIG. 22.

Figure 22:
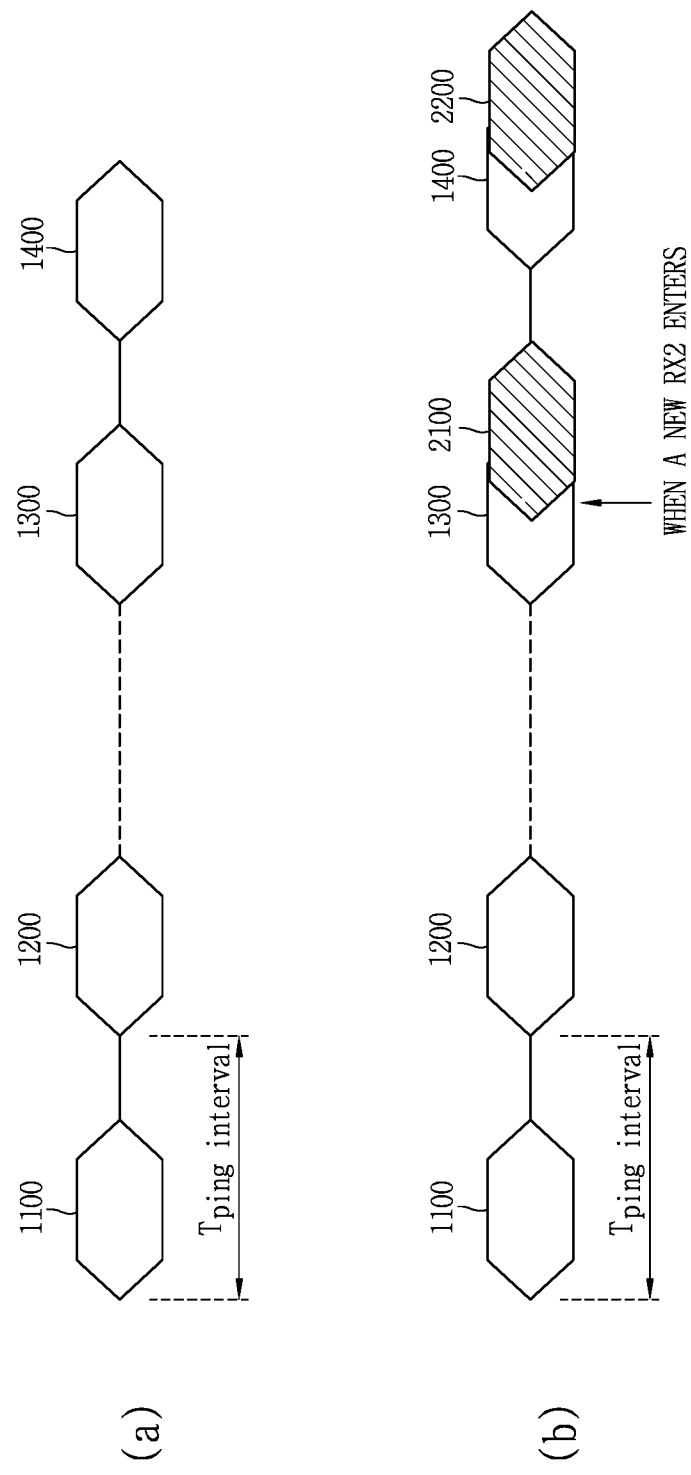
FIG. 22 is a view illustrating a process that the response signals of the plurality of electronic devices collide with each other.

Description of Collision Between Response Signals of a Plurality of Electronic Devices FIG. 22 is a view illustrating a process that the response signals of the plurality of electronic devices collide with each other.

Referring to FIG. 22, the first electronic device 200a may transmit response signals 1100, 1200, 1300 and 1400 corresponding to the wireless power signal to the wireless power transmitter 100 within a predetermined response period (Tping interval) (see FIG. 22A).

Here, the wireless power transmitter 100 may decode the response signals 1100, 1200, 1300 and 1400 corresponding to the wireless power signal to acquire a packet that the first electronic device 200a is intended to transmit. Hereinafter, a case where the wireless power transmitter 100 normally acquires a packet transmitted through the communication with the first electronic device 200a (RX1) is referred to as a normal communication.

However, during the normal communication between the wireless power transmitter 100 and the first electronic device 200a (RX1), one or more electronic devices, which are different from each other, may be newly placed in or enter an active area or detection area of the wireless power transmitter 100 to receive power transferred from the wireless power transmitter 100. FIG. 22B illustrates the case where one or more different electronic devices are the second electronic device 200b (RX2).

Here, the second electronic device 200b (RX2) may also transmit different response signals 2100 and 2200 corresponding to the wireless power signal. Accordingly, the response signals 1300 and 1400 transmitted from the first electronic device 200a (RX1) may collide with the response signals 2100 and 2200 transmitted from the second electronic device 200b (RX2).

Therefore, the wireless power transmitter 100 may be unable to decode the transmitted response signals 1300, 1400, 2100 and 2200 after reception. Consequently, the wireless power transmitter 100 may be unable to acquire power control messages included in the transmitted response signals 1300, 1400, 2100 and 2200.

In FIG. 22B, the first electronic device 200a (RX1) performs the normal communication with the wireless power transmitter 100 through a periodical transmission of the response signals 1100 and 1200 within the predetermined response period (Tping interval 1).

However, during the normal communication, the second electronic device 200b (RX2) is newly placed in or enters the active area or detection area of the wireless power transmitter 100 and transmits the response signals 2100 and 2200. This causes the collision between the response signals 1300 and 1400 of the first electronic device 200a (RX1) and the response signals 2100 and 2200 of the second electronic device 200b (RX2).

When the second electronic device 200b (RX2) enters as illustrated in FIG. 22B, the wireless power transmitter 100 may be unable to decode neither the RX1 response signal nor the RX2 response signal due to the collision between the response signals 1300 and 1400 of the first electronic device 200a (RX1) and the response signals 2100 and 2200 of the second electronic device 200b (RX2). Consequently, the wireless power transmitter 100 may fail to acquire the power control messages included in the transmitted response signals 1300, 1400, 2100 and 2200.

The collision between the response signals 1300 and 1400 of the first electronic device 200a (RX1) and the response signals 2100 and 2200 of the second electronic device 200b (RX2) may occur in one of operation states of the wireless power transmitter 100 and the first electronic device 200a (RX1), namely, one of the selection phase 610, the ping phase 620, the identification and configuration phase 630 and the power transfer phase 640 (see FIG. 14).

Therefore, there is required a method for preventing the collision between the response signals caused due to entrance of the plurality of electronic devices into the wireless power transmitter 100.

Hereinafter, a method for avoiding signal collision in a unidirectional communication upon a wireless power transfer in accordance with exemplary embodiments will be described with reference to FIGS. 23 and 24.

Figure 23:
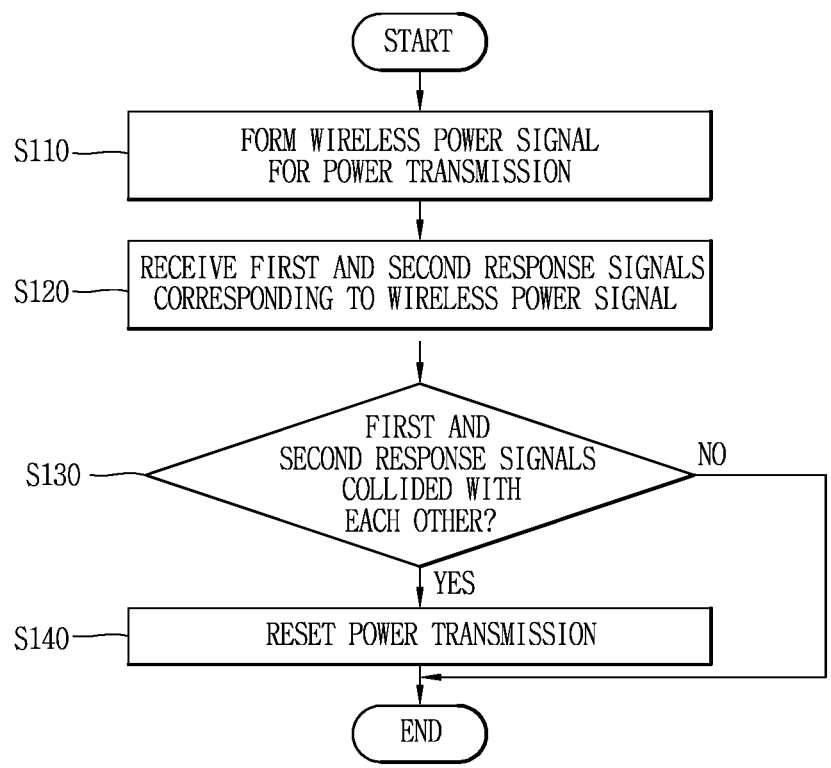
FIG. 23 is a flowchart illustrating a method for controlling a wireless power transmitter to avoid signal collision in a unidirectional communication upon a wireless power transfer in accordance with one exemplary embodiment.

Wireless Power Transmitter for Avoiding Signal Collision in Wireless Power Transfer and Control Method Thereof FIG. 23 is a flowchart illustrating a method for controlling a wireless power transmitter to avoid signal collision in a unidirectional communication upon a wireless power transfer in accordance with one exemplary embodiment.

Referring to FIG. 23, in order to avoid signal collision in a unidirectional communication during wireless power transfer, the wireless power transmitter 100 may form a wireless power signal for power transfer (S110).

Also, the wireless power transmitter 100 may receive a first response signal and a second response signal corresponding to the wireless power signal (S120). The first and second response signals may be received from a first device and a second device, respectively.

The wireless power transmitter 100 may determine whether or not the first response signal and the second response signal collide with each other (S130).

The wireless power transmitter 100 may also reset (reconfigure) the power transfer when the first response signal and the second response signal have collided with each other based on the determination result (S140).

Based on the determination result, the wireless power transmitter 100 may reset the power transfer when the first and second response signals have collided with each other, or terminate the control process when the first and second response signals have not collided with each other.

Next, in the wireless power transfer according to the one exemplary embodiment, the wireless power transmitter for avoiding the signal collision in the unidirectional communication may include a power conversion unit 111 and a power transmission control unit 112. In addition to those elements, the wireless power transmitter may further include various constituent elements for performing the function of avoiding the signal collision in the unidirectional communication during the wireless power transfer.

The power conversion unit 111 may form a wireless power signal for power transfer, and receive a first response signal and a second response signal corresponding to the wireless power signal.

The power transmission control unit 112 may determine whether or not the first and second response signals collide with each other, and reset the power transfer based on the determination result when the first and second response signals have collided with each other.

The first and second response signals may be generated by modulating the wireless power signal by the first device and the second device.

According to the reset result of the power transfer, the power transmission control unit 112 may control the power conversion unit 111 to sequentially receive the first response signal and the second response signal, which are formed to avoid collision therebetween.

The sequential reception indicates that the first response signal is received after a first time interval and the second response signal is received after a second time interval within a predetermined response period. The first and second time intervals may be decided based on a value obtained by generating a random number.

For example, the first time interval having a value obtained by generating a random number may be 10 ms, and the second time interval may be 40 ms. Therefore, the first device and the second device may transmit the first response signal and the second response signal with time delays of 10 ms and 40 ms, respectively, so as to prevent the collision between the first response signal and the second response signal after the resetting of the power transfer.

The predetermined response period (Tping interval) may be decided to be long enough to include the first response signal and the second response signal. Also, it may be decided after resetting the power transfer.

Also, when a plurality of electronic devices are newly placed in or enter an active area or detection area of the wireless power transmitter 100 in order to receive power transferred from the wireless power transmitter 100, the predetermined response period (Tping interval) should be set to be long enough to include response signals of the plurality of electronic devices corresponding to the wireless power signal. Accordingly, the response signals may be transmitted to the wireless power transmitter 100 with time intervals. This may result in reducing probability of the collision between the response signals.

For example, when a time length that each of the first response signal and the second response signal occupies in a time area (i.e., a time length of a packet when each of the response signals includes a packet including a power control message) is 100 ms, the predetermined response period (Tping interval) may be longer than at least 200 ms.

In one exemplary embodiment, the predetermined response period (Tping interval) may be initially set by considering the number of the plurality of electronic devices which may enter.

In another exemplary embodiment, although the predetermined response period (Tping interval) may be initially set to a first response period (Tping interval_1) which includes only a response period corresponding to one electronic device, when a plurality of electronic devices which are different from each other are placed in or enter an active area or detection area of the wireless power transmitter 100, the predetermined response period (Tping interval) may be newly set to a second response period (Tping interval_2) which includes all of the response signals of plurality of electronic devices which are different from each other.

For example, when a time length of each of the first and second response signals is 100 ms, the predetermined response period (Tping interval) may be initially set to 200 ms. However, after the predetermined response period has initially been set to a first response period (Tping interval_1) of 100 ms, when a plurality of electronic devices which are different from each other are placed in or enter the active area of detection area of the wireless power transmitter 100, the predetermined response period (Tping interval) may change to a second response period (Tping interval_2) of 200 ms, thereby being set to be long enough to include both the first and second response signals.

In one exemplary embodiment, whether or not the collision has occurred may be determined based on whether or not the first and second response signals are decoded using a preset format, and the preset format may include a preamble, a head and a message. Whether or not the first and second response signals collide with each other may be determined based on whether or not the first and second response signals are not recoverable due to an error generation in at least one of the preamble, the header and the message caused by the collision.

In one exemplary embodiment, the power conversion unit 111 may periodically receive a response signal of the first device, which does not collide with a response signal of the second device, within a first response period (Tping interval_1). The power transmission control unit may decode the first response signal and the second response signal using a preset format, and determine whether or not the first and second response signals have collided with each other based on whether or not the decoding is performed. Here, the first response signal and the second response signal may be periodically received within a second response period (Tping interval_2). The second response period (Tping interval_2) may be decided to be long enough to include both the first and second response signals, and decided after resetting the power transmission.

The second response period (Tping interval_2) should be set to be long enough to include both the first and second response signals. The first response period (Tping interval_1) and the second response period (Tping interval_2) may be set to the same time. Alternatively, when the second device is newly placed in or enters the active area or detection area of the wireless power transmitter 100, the response period may change from the first response period (Tping interval_1) into the second response period (Tping interval_2).

In one exemplary embodiment, the first response signal and the second response signal may be the wireless power signals modulated by the first and second devices, respectively. Whether or not the collision has occurred may be determined based on whether or not the first device and the second device are detectable based on the first and second response signals, respectively.

The detection of the first device and the second device by the wireless power transmitter 100 may indicate a detection performed in an analog detection process (analog ping) as the selection phase 610 of the operation states of the wireless power transmitter 100, and a detection performed in a digital ping as the ping phase 620. However, broadly speaking, the detection of the first device and the second device by the wireless power transmitter 100 may include detections in the identification and configuration phase 630 and the power transfer phase 640.

In one exemplary embodiment, the first response signal and the second response signal may include identification information related to the first device and the second device, respectively. Whether or not the collision has occurred may be determined based on whether or not the identification information on the detected second device is acquired through the reception of the first and second response signals.

The identification information, as aforementioned, may include at least one of information indicating a version of the contract for wireless power transfer, information for identifying a manufacturer of the electronic device 100, information indicating presence or absence of an extended device identifier, and a basic device identifier.

The reconfiguration of the power transfer may indicate various operations of the wireless power transmitter 100 for avoiding the collision between the response signals, and aims at notifying the collision of the response signals to a plurality of electronic devices, which enter the wireless power transmitter 100 through the reconfiguration of the power transmission.

In one exemplary embodiment, the reconfiguration of the power transmission may indicate a termination of forming the wireless power signal for the power transmission. For example, terminating the formation of the wireless power signal may indicate blocking of power supplied to the plurality of electronic devices. The blocking of the power supply may allow the plurality of electronic devices to be known of the collision between the response signals. The plurality of electronic devices may then change their own associated setting through a reset operation such that the response signals cannot collide with each other. The associated setting may be a delay time used for transmission of the response signal. For example, the changed delay time may be the first time interval or the second time interval.

In one variation, the reconfiguration of the power transmission may be to transmit a signal, which includes information indicating the collision between the first response signal and the second response signal, to each of the first and second devices.

The wireless power transmitter 100 may transmit the signal including information indicating the collision between the first response signal and the second response signal through data communication with the electronic device 200 established by the wireless Internet module 213 or the short-range communication module 214 of the electronic device 200. Here, the wireless power transmitter 100 may transmit information indicating the collision between the first and second response signals so as to induce a reset operation of the plurality of electronic devices for avoiding such collision between the response signals.

Figure 24:
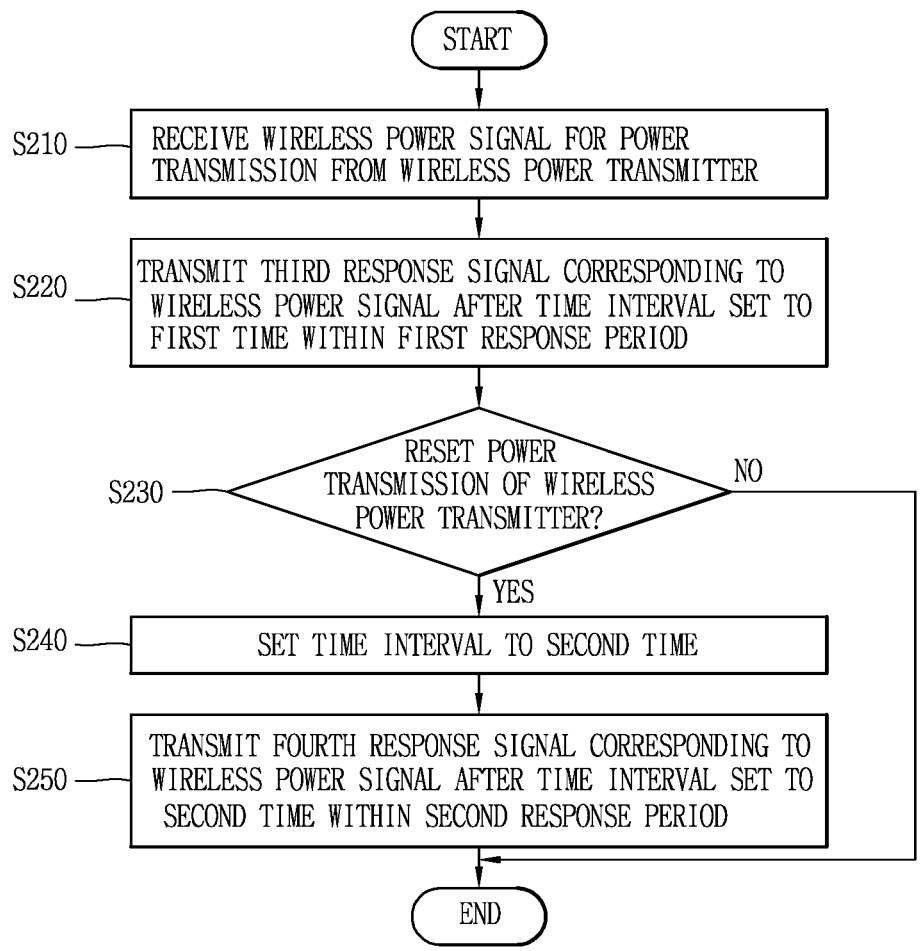
FIG. 24 is a flowchart illustrating a method for controlling an electronic device to avoid signal collision in a unidirectional communication upon a wireless power transfer in accordance with one exemplary embodiment.

Electronic Device for Avoiding Signal Collision in Wireless Power Transfer and Control Method Thereof FIG. 24 is a flowchart illustrating a method for controlling an electronic device to avoid signal collision in a unidirectional communication upon a wireless power transfer in accordance with one exemplary embodiment.

Referring to FIG. 24, in order to avoid signal collision in a unidirectional communication upon a wireless power transfer, the electronic device 200 may receive a wireless power signal for power transmission from the wireless power transmitter 100 (S210).

The electronic device 200 may also transmit a third response signal corresponding to the wireless power signal after a time interval set to a first time within a first response period (S220).

The electronic device may determine whether or not the power transmission of the wireless power transmitter has been reset (reconfigured) (S230), and set the time interval to a second time when it is determined that the power transmission has been reset (S240).

Next, the electronic device 200 may transmit a fourth response signal corresponding to the wireless power signal after the time interval set to the second time within a second response period (S250).

The electronic device 200 may transmit the fourth response signal corresponding to the wireless power signal after the time interval set to the second time within the second response period. Otherwise, when the power transmission has not been reset, the control process of the electronic device 200 may be terminated.

The electronic device 200 for avoiding signal collision in the unidirectional communication during the wireless power transfer in accordance with the one exemplary embodiment may include a power receiving unit 291 and a power reception control unit (or power receiving control unit) 292. In addition to them, the electronic device 200 may further include various constituent elements for performing the function of avoiding the signal collision in the unidirectional communication during the wireless power transfer.

The power receiving unit 291 may receive a wireless power signal for power transmission form the wireless power transmitter.

The power reception control unit (or power receiving control unit) 292 may control the power receiving unit 291 to transmit a third response signal corresponding to the wireless power signal after a time interval set to a first time within a first response period (Tping interval_1).

Also, the power reception control unit (or power receiving control unit) 292 may determine whether or not the power transmission of the wireless power transmitter 100 has been reset (reconfigured), and set the time interval to a second time when it is determined that the power transmission has been reset.

In addition, the power reception control unit (or power receiving control unit) 292 may control the power receiving unit 291 to transmit a fourth response signal corresponding to the wireless power signal after a time interval set to the second time within a second response period (Tping interval_2). The second time may be decided based on a value obtained by generating a random number. Also, the second response period (Tping interval_2) may be decided long enough to include both the fourth response signal and a fifth response signal transmitted from another electronic device.

As aforementioned, the second response period (Tping interval_2) may be initially set by considering the number of the plurality of electronic devices which are allowed to enter. However, after the second response period (Tping interval_2) has been initially set to the same value as the first response period (Tping interval_1), which includes only the response period corresponding to one electronic device, when a plurality of electronic devices different from each other are newly placed in or enter the active area or detection area of the wireless power transmitter 100, the second response period (Tping interval_2) may be newly set to include all of the response signals of the plurality of electronic devices different from each other.

In one exemplary embodiment, whether or not the power transmission has been reset may be determined based on whether or not the wireless power signal has been received.

As aforementioned, the resetting of the power transmission may indicate a termination of forming the wireless power signal for the power transmission. Hence, when the formation of the wireless power signal is terminated, the electronic device 200 may not receive the wireless power signal any more.

For example, terminating the formation of the wireless power signal may indicate blocking of power supplied to the plurality of electronic devices. The blocking of the power supply may allow the plurality of electronic devices to be known of the collision between the response signals. The plurality of electronic devices may then change their own associated setting through a reset operation such that the response signals cannot collide with each other.

In one variation, whether or not the power transmission has been reset may be determined based on whether or not a signal, which includes information indicating that the third response signal from the wireless power transmitter 100 is not decoded using a predetermined format.

The reception of the signal including information indicating that the third response signal is not decoded using the predetermined format may be performed through data communication with the electronic device 200 established by the wireless Internet module 213 or the short-range communication module 214 of the electronic device 200.

In one variation, the third response signal may include a preamble, a head and a message. The information indicating that the third response signal is not decoded using the predetermined format may be information indicating that the third response signal is not recoverable due to an error generation in at least one of the preamble, the header and the message caused by the collision.

In one variation, the third response signal may include identification information related to the electronic device 200. The information indicating that the third response signal is not decoded using the predetermined format may be information indicating that the wireless power transmitter 100 is unable to acquire the identification information related to the electronic device based on the reception of the third response signal.

The identification information, as aforementioned, may include at least one of information indicating a version of the contract for wireless power transfer, information for identifying a manufacturer of the electronic device 100, information indicating presence or absence of an extended device identifier, and a basic device identifier.

Description of First Exemplary Embodiment

The first exemplary embodiment may be implemented by part of or in combination of the configuration or steps included in the aforementioned exemplary embodiments, or in combination of the aforementioned exemplary embodiments. To describe the first exemplary embodiment disclosed in this specification, repetitive description will be omitted.

Figure 25:
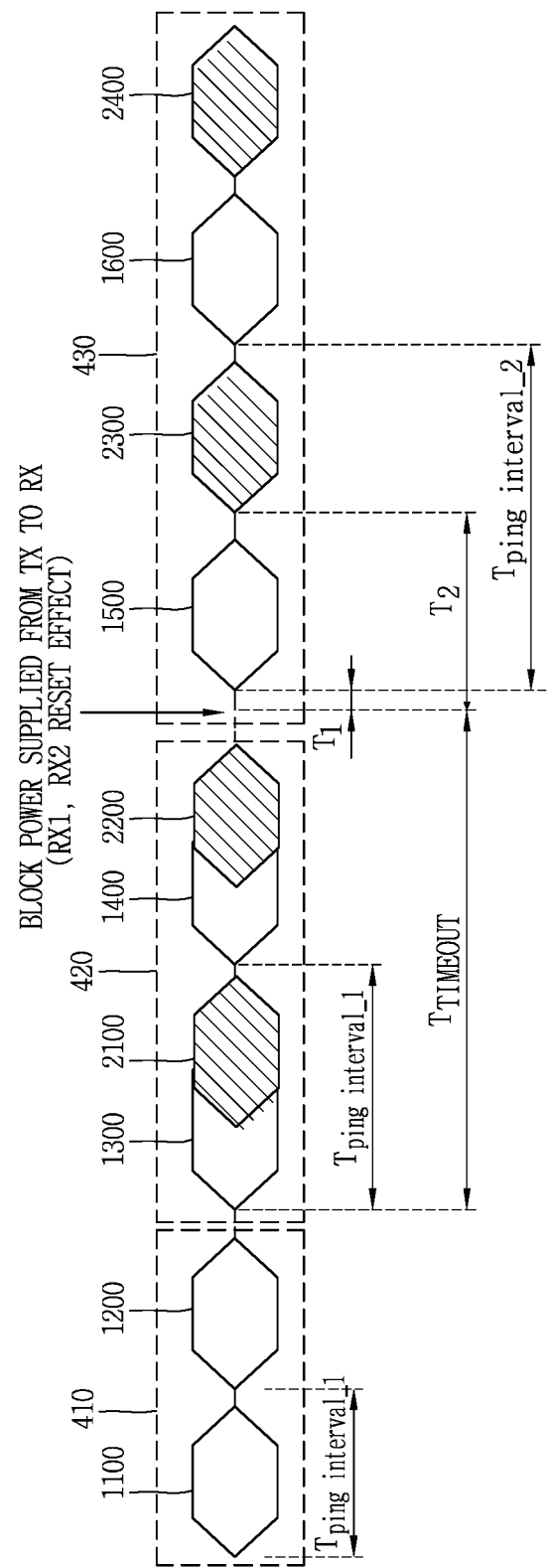
FIG. 25 is an exemplary view illustrating a signal collision avoiding method in a unidirectional communication upon a wireless power transfer in accordance with a first exemplary embodiment.

FIG. 25 is an exemplary view illustrating a signal collision avoiding method in a unidirectional communication upon a wireless power transfer in accordance with a first exemplary embodiment.

In FIG. 25, TX denotes a wireless power transmitter 100, and RX1 and RX2 denote a first electronic device 200a and a second electronic device 200b as electronic devices 100 (RX) for receiving power from the wireless power transmitter 100.

Referring to FIG. 25, the first electronic device 200a (RX1) may periodically transmit first response signals 1100 and 1200 at a first response period (Tping interval_1) within a first section 410. Here, the wireless power transmitter 100 (TX) may decode the first response signals 1100 and 1200 to acquire power control messages included in the first response signals 1100 and 1200, thereby performing a normal communication with the first electronic device 200a (RX).

Within a second section 420, the second electronic device 200b (RX) may be newly placed in or enter an active area or detection area of the wireless power transmitter 100. Here, the second electronic device 200b (RX) may transmit second response signals 2100 and 2200 and accordingly may cause collision between the first response signals 1100 and 1200 and the second response signals 2100 and 2200.

To avoid the collision between the first response signals 1100 and 1200 and the second response signals 2100 and 2200, the wireless power transmitter 100 (TX) may reset (reconfigure) power transmission.

As aforementioned, the resetting of the power transmission may be performed as the wireless power transmitter 100 blocks transmission of the wireless power signal. The blocking of the transmission of the wireless power signal may indicate blocking of power supplied to the first electronic device 200a (RX1) and the second electronic device 200b (RX2).

As the power supplied to the first electronic device 200a (RX1) and the second electronic device 200b (RX2) is blocked, the first electronic device 200a (RX1) and the second electronic device 200b (RX2) may perform a reset operation, thereby resetting a first time T1, which is a time interval for transmitting the first response signal with a delay, and a second time T2, which is a time interval for transmitting the second response signal with a delay. For example, the first time T1 may be reset from 0 ms to 10 ms, and the second time T2 may be reset from 0 ms to 40 ms.

Within a third section 430, after resetting the power transmission, the first electronic device 200a (RX1) may periodically transmit first response signals 1500 and 1600 after the first time T1 at the second response period (Tping interval_2). Also, the second electronic device 200b (RX2) may periodically transmit second response signals 2300 and 2400 after the second time T2 at the second response period (Tping interval_2). Accordingly, the first response signals 1500 and 1600 and the second response signals 2300 and 2400, which are formed to avoid collision with each other, may be transmitted in a sequential manner.

As aforementioned, the second response period (Tping interval_2) should be set long enough to include both the first response signals 1500 and 1600 and the second response signals 2300 and 2400. Here, the first response period (Tping interval_1) and the second response period (Tping interval_2) may be initially set to the same time. However, when the second electronic device 200b (RX2) is newly placed in or enters the active area or detection area of the wireless power transmitter 100, the response period may change from the first response period (Tping interval_1) into the second response period (Tping interval_2).

In FIG. 25, Ttimeout may indicate a time, starting from a time point when the collision has occurred between the first response signals 1500 and 1600 and the second response signals 2300 and 2400, until the operation state of the wireless power transmitter 100 (TX) is converted from a power transfer state into an idle state due to blocking of the power supply. The reset operation of the first device RX1 and the second device RX2 may be started from the Ttimeout.

Description of Second Exemplary Embodiment

The second exemplary embodiment may be implemented by part of or in combination of the configuration or steps included in the aforementioned exemplary embodiments, or in combination of the aforementioned exemplary embodiments. To describe the second exemplary embodiment disclosed in this specification, repetitive description will be omitted.

Hereinafter, description will be given of a method for avoiding signal collision in a unidirectional communication upon a wireless power transfer according to a second exemplary embodiment.

In accordance with the second exemplary embodiment, the wireless power transmitter 100 (TX) may perform a normal communication with a plurality of electronic devices RX1 to RXn−1. Here, during the normal communication, a new electronic device RXn may be placed in or enter the active area or detection area of the wireless power transmitter 100. Therefore, response signals of the plurality of electronic devices RX1 to RXn−1 may collide with a response signal of the new electronic device RXn. Here, the wireless power transmitter 100 may reset power transmission.

In accordance with the second exemplary embodiment, the wireless power transmitter 100 may re-receive the response signals of the plurality of electronic devices RX1 to RXn−1 and the response signal of the RXn after resetting the power transmission. After reception of the response signals of the plurality of electronic devices RX1 to RXn−1 and the response signal of the RXn, if those response signals collide with each other, the wireless power transmitter 100 may reset the power transmission once again.

Figure 26:
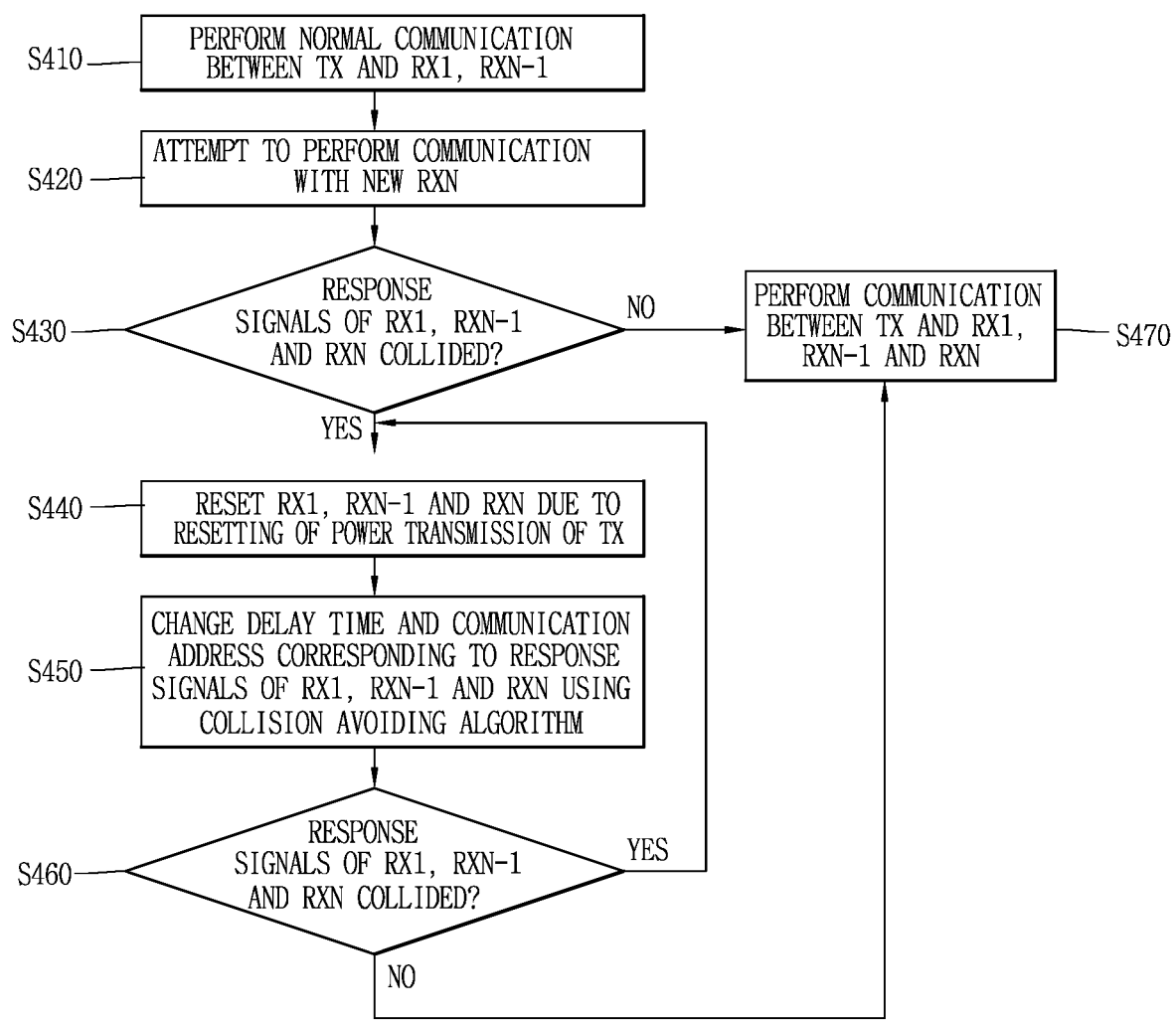
FIG. 26 is a flowchart illustrating a signal collision avoiding method in a unidirectional communication upon a wireless power transfer in accordance with a second exemplary embodiment.

FIG. 26 is a flowchart illustrating a signal collision avoiding method in a unidirectional communication upon a wireless power transfer in accordance with a second exemplary embodiment.

Referring to FIG. 26, the wireless power transmitter 100 (TX) may perform a normal communication with the plurality of electronic devices RX1 to RXn−1 (S410).

During the normal communication, a new electronic device RXn may be placed in or enter the active area or detection area of the wireless power transmitter 100. Here, the wireless power transmitter 100 (TX) may attempt to perform a new communication with the RXn (S420).

The wireless power transmitter 100 (TX) may determine whether or not response signals of the plurality of electronic devices RX1 to RXn−1 collide with a response signal of the RXn (S430).

In one exemplary embodiment, whether or not such collision has occurred may be determined based on whether or not the response signals of the plurality of electronic devices RX1 to RXn−1 and the response signal of the RXn are decodable using a preset format.

Also, the preset format may include a preamble, a head and a message. Whether or not the response signals of the plurality of electronic devices RX1 to RXn−1 collide with the response signal of the RXn may be determined based on whether or not the response signals of the plurality of electronic devices RX1 to RXn−1 and the response signal of the RXn are not recoverable due to an error generation in at least one of the preamble, the header and the message caused by the collision.

Next, when it is determined that the response signals of the plurality of electronic devices RX1 to RXn−1 have collided with the response signal of the RXn, the wireless power transmitter 100 (TX) may reset power transmission. When the response signals of the RX1 to RXn have not collided with each other, the wireless power transmitter 100 (TX) may perform the normal communication with the RX1 to RXn (S470).

As described above, the resetting of the power transmission may be performed as the wireless power transmitter 100 blocks transmission of the wireless power signal. The blocking of the transmission of the wireless power signal may indicate blocking of power supplied to the RX1 to RXn.

The resetting of the power transmission may induce resetting of the RX1 to RXn. That is, the RX1 to RXn may detect the resetting of the power transmission to determine whether or not the response signals of the plurality of electronic devices RX1 to RXn−1 have collided with the response signal of the RXn, and reset their own settings based on the determination result (S440).

The RX1 to RXn may change a delay time corresponding to each of the response signals thereof using a collision avoiding algorithm, and change a communication address corresponding to each delay time (S450).

The collision avoiding algorithm indicates that after resetting the power transmission, a delay time corresponding to each of the response signals of the RX1 to RXn is decided based on a value obtained by generating a random number. For example, the RX1 to RXn may generate random numbers to change the delay times corresponding to the response signals thereof into T1 to Tn, respectively.

The communication addresses may be means for storing the delay times corresponding to the response signals of the RX1 to RXn. Also, the communication addresses may function as addresses for allowing the normal communication between the RX1 to RXn and the wireless power transmitter 100 (TX).

Afterwards, the RX1 to RXn may transmit the response signals thereof to the wireless power transmitter 100 (TX) after the changed time intervals of T1 to Tn, respectively.

Here, the wireless power transmitter 100 (TX) may determine again whether or not the response signals of the RX1 to RXn collide with each other (S460).

When it is determined that the response signals of the RX1 to RXn have collided with each other, the process may move back to the reset step (S440) of the RX1 to RXn.

When the response signals of the RX1 to RXn have not collided with each other, the wireless power transmitter 100 (TX) may perform the normal communication with the RX1 to RXn (S470).

Third Exemplary Embodiment—Signal Collision Avoiding Method Through Listening Mode The third exemplary embodiment may be implemented by part of or in combination of the configuration or steps included in the aforementioned exemplary embodiments, or in combination of the aforementioned exemplary embodiments. To describe the third exemplary embodiment disclosed in this specification, repetitive description will be omitted.

A wireless power transmitter according to a third exemplary embodiment may include a power conversion unit to form a wireless power signal for power transmission, and a power transmission control unit to control the power conversion unit to receive a first response signal corresponding to the wireless power signal from a first wireless power receiver and to receive a second response signal, which does not collide with the first response signal, from a second wireless power receiver.

In accordance with the third exemplary embodiment, the second wireless power receiver may receive the first response signal, detect a time point when the second response signal avoids collision with the first response signal, and generate the second response signal at the collision-avoided time point.

Figure 27:
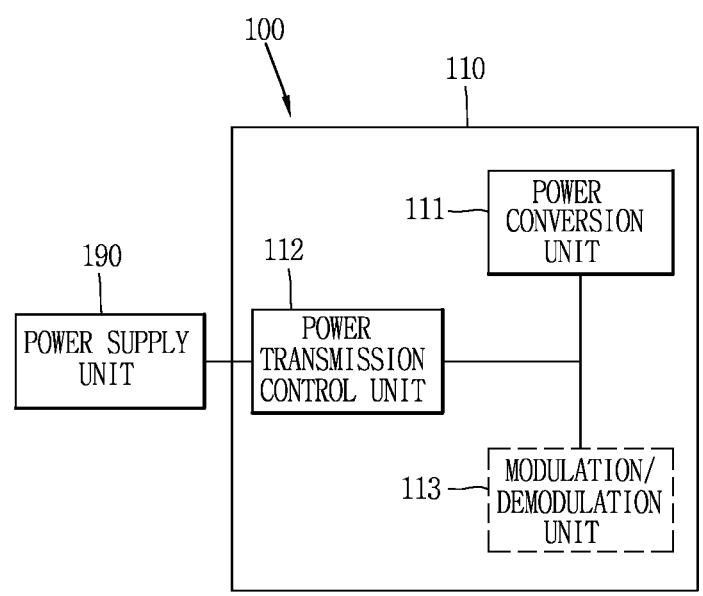
FIG. 27 is a view illustrating a configuration of a wireless power transmitter having a signal collision avoiding function in accordance with a third exemplary embodiment.

FIG. 27 is a view illustrating a configuration of a wireless power transmitter having a signal collision avoiding function in accordance with a third exemplary embodiment.

Referring to FIG. 27, a wireless power transmitter for avoiding signal collision in a unidirectional communication during a wireless power transfer in accordance with one exemplary embodiment may include a power conversion unit 111 and a power transmission control unit 112. In addition to them, the wireless power transmitter may further include various constituent elements for performing the function of avoiding signal collision in the unidirectional communication during the wireless power transfer.

Hereinafter, each of the constituent elements will be described in a sequential manner.

The power conversion unit 111 may form a wireless power signal for power transmission, and receive a response signal corresponding to the wireless power signal from a wireless power receiver 200.

The response signal may be generated by modulating the wireless power signal by the wireless power receiver 200.

The power transmission control unit 112 may control the power conversion unit 111 to receive a first response signal corresponding to the wireless power signal from a first wireless power receiver.

The power transmission control unit 112 may control the power conversion unit 111 to receive a second response signal, which does not collide with the first response signal, from a second wireless power receiver.

Here, the second wireless power receiver may receive the first response signal.

The second wireless power receiver may detect a time point when the second response signal does not collide with the first response signal.

Here, the first response signal and the second response signal may be formed by modulating the wireless power signal.

More concretely, the power transmission control unit 112 may periodically receive the first response signal corresponding to the wireless power signal from the first wireless power receiver Rx1 through the power conversion unit 111. This operation may be referred to listening to the first response signal (or listen to Listen Rx1).

In accordance with the third exemplary embodiment, when the second wireless power receiver Rx2 is newly placed in a specific area, the second wireless power receiver Rx2 may operate in a listening mode.

Here, the specific area may indicate an area through which the wireless power signal passes or an area in which the second wireless power receiver Rx2 is detected.

The listening mode may indicate an operation that the second wireless power receiver Rx2 receives a response signal of another wireless power receiver, which has been connected to the wireless power transmitter 100.

Therefore, when the second wireless power receiver Rx2 operates in the listening mode, the second wireless power receiver Rx2 may receive the first response signal.

Here, the second wireless power receiver Rx2 may detect a time point when the second response signal does not collide with the first response signal.

The second wireless power receiver Rx2 may then generate a second response signal at the collision-avoided time point.

Accordingly, the wireless power transmitter 100 may receive the first and second response signals which do not collide with each other.

Figure 28:
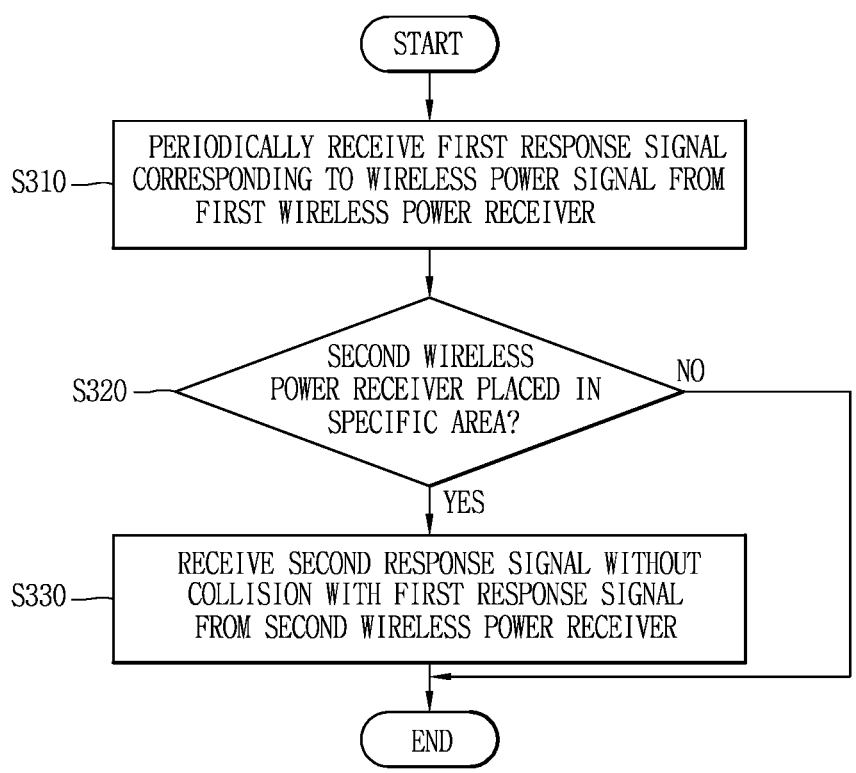
FIG. 28 is a flowchart illustrating a signal collision avoiding method in accordance with a third exemplary embodiment.

FIG. 28 is a flowchart illustrating a signal collision avoiding method in accordance with a third exemplary embodiment.

Referring to FIG. 28, a signal collision avoiding method according to a third exemplary embodiment may include the following steps.

First, the wireless power transmitter may periodically receive a first response signal corresponding to a wireless power signal from a first wireless power receiver (S310).

The wireless power transmitter may determine whether or not a second wireless power receiver has been placed in a specific area (S320).

When the second wireless power receiver has been placed in (entered) the specific area, the wireless power transmitter may receive a second response signal, which does not collide with the first response signal, from the second wireless power receiver (S330).

Here, the second wireless power receiver may receive the first response signal. To this end, the second wireless power receiver may enter the listening mode to receive (or listen to) the first response signal.

The second wireless power receiver may detect a time point when the second response signal avoids collision with the first response signal.

The second wireless power receiver may then generate the second response signal at the collision-avoided time point.

Figure 29:
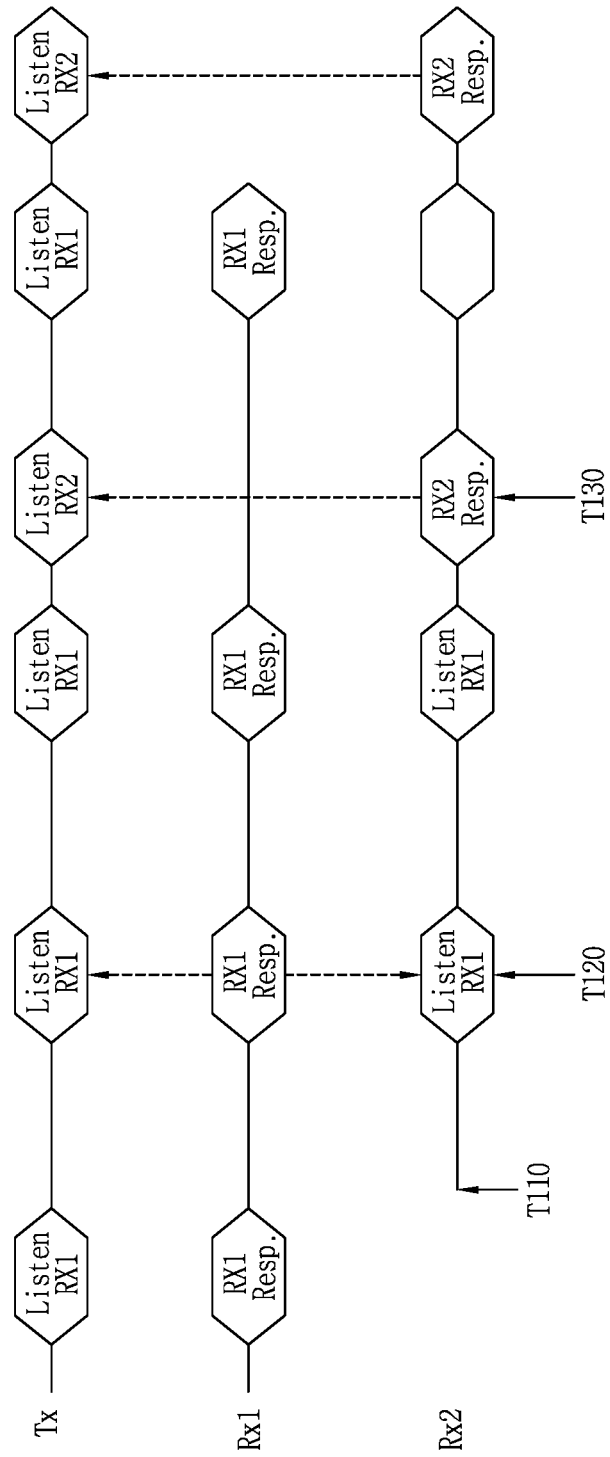
FIG. 29 is an exemplary view illustrating the signal collision avoiding method in accordance with the third exemplary embodiment.

FIG. 29 is an exemplary view illustrating the signal collision avoiding method in accordance with the third exemplary embodiment.

Referring to FIG. 29, the wireless power transmitter 100 (TX) may generate a wireless power signal for transferring power in a wireless manner.

Here, the first wireless power receiver Rx1 may generate a first response signal Rx1 resp. corresponding to the wireless power signal.

The first wireless power receiver Rx1 may generate the first response signal by modulating the wireless power signal. For example, a modulation/demodulation unit 293 included in the first wireless power receiver Rx1 may modulate the wireless power signal. Here, the first response signal may be transmitted in a packet format to the wireless power transmitter Tx by being included in a power control message.

The wireless power transmitter Tx may receive the first response signal (Listen Rx1) generated by the first wireless power receiver Rx1.

When a second wireless power receiver Rx2 is newly placed in (or enters) a specific area, the second wireless power receiver Rx2 may enter a listening mode.

Here, the specific area may indicate an area through which the wireless power signal passes or an area in which the second wireless power receiver Rx2 is detected.

The listening mode may be an operation mode for avoiding signal collision with another wireless power receiver which is performing communication with the wireless power transmitter Tx.

That is, the second wireless power receiver Rx2 may enter the listening mode at a first time point T110, and listen to (or receive) the first response signal at a second time point T120.

Here, upon generating the second response signal (Rx2 resp.) corresponding to the wireless power signal, the second wireless power receiver Rx2 may generate the second response signal at a third time point T130 at which the second response signal avoids collision with the first response signal.

The wireless power transmitter Tx may receive the second response signal, starting from the third time point.

Accordingly, the wireless power transmitter Tx may periodically receive the first and second response signals, which avoid collision with each other after a specific time point (for example, the third time point).

Figure 30:
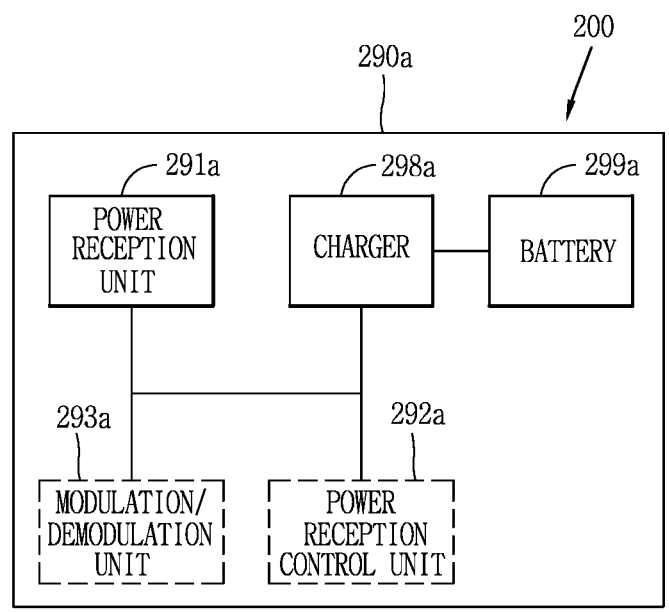
FIG. 30 is a view illustrating a configuration of a wireless power receiver in accordance with a third exemplary embodiment.

FIG. 30 is a view illustrating a configuration of a wireless power receiver in accordance with a third exemplary embodiment.

The wireless power receiver illustrated in FIG. 30 may perform an operation corresponding to the aforementioned second wireless power receiver.

Referring to FIG. 30, the wireless power receiver 200 may include a power supply unit 290a. The power supply unit 290a may supply power required for operations of the wireless power receiver 200. The power supply unit 290a may include a power receiving unit 291a and a power reception control unit (or power receiving control unit) 292a.

The power receiving unit 291a may receive power transferred from the wireless power transmitter 100 in a wireless manner. To this end, the power receiving unit 291a may include at least one coil for receiving a wireless power signal transmitted in the form of a magnetic field or electromagnetic field having a vibration characteristic.

In one exemplary embodiment, as a constituent element according to the inductive coupling method, the power receiving unit 291a may include at least one secondary coil to which a current is induced by a changing magnetic field.

In one exemplary embodiment, as a constituent element according to the resonance coupling method, the power receiving unit 291a may include at least one coil and at least one resonant circuit in which resonance phenomenon is generated by a magnetic field having a specific resonant frequency.

To supply power in a wireless manner to the wireless power receiver 200, the wireless power transmitter 100 may receive information related to the wireless power receiver

200. The information related to the wireless power receiver 200 may be transmitted through a power control message in a digital data format.

For the transmission of the power control message in the digital data format, the power reception control unit (or power receiving control unit) 292*a* may modulate the wireless power signal so as to include a packet, which includes the power control message, while receiving the wireless power signal. Hereinafter, the modulated wireless power signal may be referred to as a response signal.

The wireless power transmitter 100 may sense the modulated wireless power signal. Here, the wireless power transmitter 100 may demodulate the sensed wireless power signal, and decode the packet from the demodulated wireless power signal.

Meanwhile, the wireless power transmitter 100 may employ various methods, such as an amplitude modulation or a phase modulation, as a modulation method for communication with the electronic device 200. In addition, it may be obvious to a skilled person in the art that the wireless power receiver or wireless power transmitter can receive or transmit data by employing various communication protocols or methods.

In accordance with the third exemplary embodiment, the power receiving unit 291*a* may receive a wireless power signal from the wireless power transmitter 100.

The modulation/demodulation unit 293*a* may generate a third response signal by modulating the wireless power signal.

The power reception control unit (or power receiving control unit) 292*a* may control the power receiving unit 291*a* to receive a fourth response signal, which is formed by another wireless power receiver receiving the wireless power signal.

The power reception control unit (or power receiving control unit) 292*a* may detect a time point when the third response signal avoids collision with the fourth response signal.

Also, the power reception control unit (or power receiving control unit) 292*a* may control the modulation/demodulation unit 293*a* to generate the fourth response signal at the collision-avoided time point.

Accordingly, the wireless power receiver 200 may safely transmit the fourth response signal to the wireless power transmitter 100 without collision with the third response signal.

The foregoing method may be implemented in a recording medium readable by a computer or its similar devices by employing, for example, software, hardware or some combinations thereof.

For a hardware implementation, the embodiments described herein may be implemented by using at least any one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein. For example, the foregoing methods may be implemented by the control unit (or controller) 180 or power transmission control unit 112 in the wireless power transmitter 100, or implemented by the controller 280 or power reception control unit (or power receiving control unit) 292 in the electronic device 200.

For a software implementation, the embodiments such as procedures and functions disclosed herein may be implemented with separate software modules. Each of the software modules may perform one or more of the functions and operations described herein. Software codes may be implemented by using a software application written in a suitable programming language. The software codes may be stored in the memory 150 in the wireless power transmitter 100, and implemented by the control unit (or controller) 180 or the power transmission control unit 112, and similarly, stored in the memory 260 in the electronic device 200, and implemented by the controller 280 or the power reception control unit (or power receiving control unit) 292.

As described above, the present disclosure provides a wireless power transmitter, a wireless power receiver and a wireless power transfer method in accordance with exemplary embodiments. When a plurality of electronic devices are placed in or enter an active area or detection area of the wireless power transmitter for receiving power in a wireless manner, a newly placed electronic device may be allowed to analyze a response signal of a previously placed electronic device (or wireless power receiver) and generate its own response signal at a collision-avoided time point, thereby avoiding collision with response signals of other electronic devices.

Especially, according to the wireless power transmitter, the wireless power receiver (or electronic device) and the wireless power transfer method disclosed herein, the probability of collision between the response signals can be reduced, which may result in an efficient and stable wireless power transmission from the wireless power transmitter to the plurality of electronic devices in a simultaneous manner.

The scope of the invention will not be limited to the embodiments disclosed herein, and thus various modifications, variations, and improvements can be made in the present invention without departing from the spirit of the invention, and within the scope of the appended claims.

What is claimed is:

1. A wireless power transmitter, comprising:
a power conversion unit for forming wireless power for power transmission via magnetic coupling between the power conversion unit and a wireless power receiver; and
a power transmission control unit for:
controlling the power conversion unit to detect a collision between a first packet generated by a first wireless power receiver and a second packet generated by a second wireless power receiver in a same time slot, and
controlling the power conversion unit to transmit information indicating the collision to the first wireless power receiver and the second wireless power receiver.

2. The wireless power transmitter of claim 1, wherein the power transmission control unit controls the power conversion unit to detect at least one of the first packet regenerated by the first wireless power receiver and the second packet regenerated by the second wireless power receiver in at least one time slot after transmitting the information.

3. The wireless power transmitter of claim 2, wherein the power transmission control unit controls the power conversion unit to detect the first packet regenerated by the first wireless power receiver at a first time slot after transmitting the information, and to detect the second packet regenerated by the second wireless power receiver at a second time slot after transmitting the information.

4. The wireless power transmitter of claim 3, wherein the first time slot is selected based on a first random number by the first wireless power receiver, and the second time slot is selected based on a second random number by the second wireless power receiver.

5. The wireless power transmitter of claim 3, wherein the power transmission control unit controls the power conversion unit to detect the first packet periodically at the first time slot, and to detect the second packet periodically at the second time slot.

6. A wireless power receiver, comprising:
a power receiving unit for receiving wireless power from a wireless power transmitter via magnetic coupling between the power receiving unit and the wireless power transmitter; and
a power reception control unit for:
controlling the power receiving unit to generate a first packet for the wireless powertransmitter, and
controlling the power receiving unit to receive information indicating a collision between the first packet and a second packet from another wireless power receiver is detected in a same time slot from the wireless power transmitter.

7. The wireless power receiver of claim 6, wherein the power reception control unit controls the power receiving unit to regenerate the first packet for the wireless power transmitter at a first time slot after receiving the information.

8. The wireless power receiver of claim 7, wherein the power reception control unit selects the first time slot based on a first random number.

9. The wireless power receiver of claim 7, wherein the power transmission control unit controls the power conversion unit to generate the first packet periodically at the first time slot.

10. A method of avoiding signal collision by a wireless power receiver, the method comprising:
receiving wireless power from a wireless power transmitter via magnetic coupling between the wireless power receiver and the wireless power transmitter;
generating a first packet for the wireless power transmitter, and
receiving information indicating a collision between the first packet and a second packet from another wireless power receiver is detected in a same time slot from the wireless power transmitter.

11. The method of claim 10, further comprising:
regenerating the first packet for the wireless power transmitter at a first time slot after receiving the information.

12. The method of claim 11, further comprising:
selecting the first time slot based on a first random number.

13. The method of claim 11, further comprising:
generating the first packet periodically at the first time slot.

\* \* \* \* \*